United States Patent

Yamamoto et al.

[11] Patent Number: 6,118,556
[45] Date of Patent: Sep. 12, 2000

[54] FILM INFORMATION COMMUNICATION APPARATUS, FILM INFORMATION PRINTING APPARATUS, INFORMATION PROCESSING APPARATUS AND INDEX PRINTER

[75] Inventors: Yuji Yamamoto; Masazumi Ishikawa, both of Wakayama, Japan

[73] Assignee: Noritsu Koki Co., Ltd., Wakayama-ken, Japan

[21] Appl. No.: 08/897,637

[22] Filed: Jul. 21, 1997

Related U.S. Application Data

[62] Division of application No. 08/403,951, Mar. 14, 1995, Pat. No. 5,703,701.

[51] Int. Cl.⁷ ................................................. H04N 1/04
[52] U.S. Cl. ........................ 358/487; 358/474; 382/312
[58] Field of Search .................................. 358/487, 474, 358/401, 488, 479, 448, 501, 506, 530, 537, 540; 355/233, 33; 348/17, 18, 22, 96; 235/487, 488, 493

[56] References Cited

U.S. PATENT DOCUMENTS

| | | | |
|---|---|---|---|
| 4,835,376 | 5/1989 | Drexler | 235/488 |
| 5,187,518 | 2/1993 | Kitagawa | 355/40 |
| 5,231,451 | 7/1993 | Ueksa et al. | 355/29 |
| 5,264,683 | 11/1993 | Yoshikawa | 235/375 |
| 5,274,422 | 12/1993 | Yoshikawa | 355/77 |
| 5,344,730 | 9/1994 | Kitamoto | 430/14 |
| 5,383,035 | 1/1995 | Suzuki | 358/487 |
| 5,420,699 | 5/1995 | Yamanouchi et al. | 358/487 |
| 5,477,353 | 12/1995 | Yamasaki | 358/487 |
| 5,907,391 | 5/1999 | Kobayashi | 355/40 |

FOREIGN PATENT DOCUMENTS

| | | |
|---|---|---|
| 0 475 278 | 3/1992 | European Pat. Off. . |
| 41 32 846 | 4/1992 | Germany . |

OTHER PUBLICATIONS

Patent Abstracts of Japan, vol. 17, No. 273, P–1545, May 26, 1993 of JP 5011353 (Fuji Photo Film Co., Ltd.), Jan. 22, 1993.

*Primary Examiner*—Jerome Grant, II
*Attorney, Agent, or Firm*—Armstrong, Westerman, Hattori, McLeland & Naughton

[57] ABSTRACT

A film information communication apparatus comprising a picture reading mechanism for reading information recorded in a photosensitive emulsion layer, in a photographic film including a photosensitive emulsion layer and a magnetic recording layer, a magnetic recording and reading mechanism for reading information recorded in the magnetic recording layer, a film information reading mechanism for reading information recorded in other portion of the film than the photosensitive emulsion layer and magnetic recording layer, and a communication control mechanism for outputting the information for printing read out by each reading mechanism. According to the communication apparatus of the present invention, even in the case of the existing printing apparatus incapable of reading the magnetic information on the film, photographic printing can be executed by communication of the printing information output from the communication apparatus, only by modifying the control board of the memory control device in the printing apparatus.

14 Claims, 33 Drawing Sheets

FIG. 9

141:
- (Film ID) RUKJ34598238
- (Type of Film) ABC GOLD 400
- (Customer's Name) Taro Yamada
- (TEL) 45-9987
- (Customer ID) KYU136378976
- (Date and Time of Reception) 93-5-7 PM2:35
- (Finishing Time) Extra-Rapid·Rapid·Normal
- (Date and Time of Finish) 93-5-7 PM4:45
- (Twin Check NO) 3486
- (Index Print) Necessary
- (Dealer ID) No
- (Dealer Instruction) No
- (Last Printer ID) No
- (Date and Time of Last Print) No
- (Type of Camera) DR3000
- (Print Size) L
- (Print Margin) No
- (Service Method) Developing and Printing

142:

Frame 1:
- (Frame NO) 1
- (Print Format) Normal
- (Number of Print) 1
- (Print Size) L
- (Print Margin) No
- (Date and Time) 93-3-23
- (Date Back Print) Yes
- (Date Front Print) Yes
- (Time Back Print) Yes
- (Time Front Print) Yes
- (Character Infomation) Oranda-mura Sightseeing Commemoration
- (Character Infomation Back Print) Yes
- (Character Infomation Front Print) No
- (Shutter Speed) 1/250
- (Iris Value) f5.6
- (Lens Used) RE135mmF2.8
- (Zoom Value) No
- (Strobe) No Use
- (Focal length) 7m
- (Light source) Day Light Frame 2:
- (Frame NO) 2
- (Print Format) Panorama
- (Number of Print) 1
- (Print Size) L
- (Print Margin) No
- (Date and Time) 93-3-23
- (Date Back Print) Yes
- (Date Front Print) Yes
- (Time Back Print) Yes
- (Time Front Print) Yes
- (Character Infomation) Oranda-mura Sightseeing Commemoration
- (Character Infomation Back Print) Yes
- (Character Infomation Front Print) No
- (Shutter Speed) 1/250
- (Iris Value) f5.6
- (Lens Used) RE135mmF2.8
- (Zoom Value) No
- (Strobe) No Use
- (Focal length) 3m
- (Light source) Day Light Frame 3:
- (Frame NO) 3
- (Print Format) Hi-Vision
- (Number of Print) 1
- (Print Size) L
- (Print Margin) No
- (Date and Time) 93-3-23
- (Date Back Print) Yes
- (Date Front Print) Yes
- (Time Back Print) Yes
- (Time Front Print) Yes
- (Character Infomation) Oranda-mura Sightseeing Commemoration
- (Character Infomation Back Print) Yes
- (Character Infomation Front Print) No
- (Shutter Speed) 1/250
- (Iris Value) f5.6
- (Lens Used) RE50mmF1.4
- (Zoom Value) No
- (Strobe) Use
- (Focal length) 5m
- (Light source) Fluorescent Light

(Film ID) RUKJ34598238　(Index Print) Necessary
(Type of Film) ABC GOLD 400　(Dealer ID) No
(Customer's Name) Taro Yamada　(Dealer Instruction) No
(TEL) 45 - 9987　(Last Printer ID) No
(Customer ID) KYU136378976　(Date and Time of Last Print) No
(Date and Time of Reception) 93・5・7 PM2 : 35　(Type of Camera) DR3000
(Finishing Time) Extra - Rapid・Rapid・Normal　(Print Size) L
(Date and Time of Finish) 93・5・7 PM4 : 45　(Print Margin) No
(Twin Check NO) 3486　(Service Method) Developing and Printing (Frame NO) 1　(Frame NO) 2　(Frame NO) 3
(Print Format) Normal　(Print Format) Panorama　(Print Format) Hi-Vision
(Number of Print) 1　(Number of Print) 1　(Number of Print) 1
(Print Size) L　(Print Size) L　(Print Size) L
(Print Margin) No　(Print Margin) No　(Print Margin) No
(Date and Time) 93・3・23　(Date and Time) 93・3・23　(Date and Time) 93・3・23
(Date Back Print) Yes　(Date Back Print) Yes　(Date Back Print) Yes
(Date Front Print) Yes　(Date Front Print) Yes　(Date Front Print) Yes
(Time Back Print) Yes　(Time Back Print) Yes　(Time Back Print) Yes
(Time Front Print) Yes　(Time Front Print) Yes　(Time Front Print) Yes
(Character Infomation)　(Character Infomation)　(Character Infomation)
Oranda-mura Sightseeing Commemoration　Oranda-mura Sightseeing Commemoration　Oranda-mura Sightseeing Commemoration
(Character Infomation Back Print) Yes　(Character Infomation Back Print) Yes　(Character Infomation Back Print) Yes
(Character Infomation Front Print) No　(Character Infomation Front Print) No　(Character Infomation Front Print) No
(Shutter Speed) 1/250　(Shutter Speed) 1/250　(Shutter Speed) 1/250
(Iris Value) f5.6　(Iris Value) f5.6　(Iris Value) f5.6
(Lens Used) RE135mmF2.8　(Lens Used) RE135mmF2.8　(Lens Used) RE50mmF1.4
(Zoom Value) No　(Zoom Value) No　(Zoom Value) No
(Strobe) No Use　(Strobe) No Use　(Strobe) Use
(Focal length) 7m　(Focal length) 3m　(Focal length) 5m
(Light source) Day Light　(Light source) Day Light　(Light source) Fluorescent. Light

FIG. 13

Record 1:
(Film ID) RUKJ3459B238
(Type of Film) ABC GOLD 400
(Customer's Name) Taro Yamada
(TEL) 45-9987
(Customer ID) KYU136378976
(Date and Time of Reception) 93·5·7 PM2:35
(Finishing Time) Extra·Rapid·Rapid·Normal
(Date and Time of Finish) 93·5·7 PM4:45
(Twin Check NO) 3486
(Index Print) Necessary
(Dealer ID) No
(Dealer Instruction) No
(Last Printer ID) No
(Date and Time of Last Print) No
(Type of Camera) DR3000
(Print Size) L
(Print Margin) No
(Service Method) Developing and Printing

| | | | | | | |
|---|---|---|---|---|---|---|
| 1 N | 2 N | 3 P | 4 H | 5 N | 6 P | 7 N |
| 8 N | 9 P | 10 H | 11 N | 12 N | 13 P | 14 N |
| 15 N | 16 P | 17 N | 18 N | 19 N | 20 P | 21 N |
| 22 H | 23 N | 24 N | | | | |

Record 2:
(Film ID) RUKJ3459B238
(Type of Film) ABC GOLD 100
(Customer's Name) Ichiro Suzuki
(TEL) 71-7283
(Customer ID) KYU136373567
(Date and Time of Reception) 93·5·7 PM2:55
(Finishing Time) Extra·Rapid·Rapid·Normal
(Date and Time of Finish) 93·5·7 PM3:55
(Twin Check NO) 3489
(Index Print) Necessary
(Dealer ID) No
(Dealer Instruction) No
(Last Printer ID) No
(Date and Time of Last Print) No
(Type of Camera) PY68
(Print Size) L
(Print Margin) No
(Service Method) Developing and Printing

| | | | | | | |
|---|---|---|---|---|---|---|
| 1 P | 2 N | 3 P | 4 N | 5 N | 6 P | 7 N |
| 8 N | 9 N | 10 N | 11 N | 12 P | 13 P | 14 N |
| 15 N | 16 N | 17 H | 18 N | 19 N | 20 N | 21 N |
| 22 P | 23 N | 24 N | 25 N | 26 N | 27 P | 28 N |
| 29 N | 30 P | 31 P | 32 N | 33 H | 34 N | 35 N |
| 36 N | | | | | | |

Record 3:
(Film ID) RUKJ34124789
(Type of Film) ABC GOLD 200
(Customer's Name) Hanako Tanaka
(TEL) 55-4609
(Customer ID) KYU133978298
(Date and Time of Reception) 93·5·7 PM3:15
(Finishing Time) Extra·Rapid·Rapid·Normal
(Date and Time of Finish) 93·5·7 PM6:45
(Twin Check NO) 3492
(Index Print) Necessary
(Dealer ID) No
(Dealer Instruction) No
(Last Printer ID) No
(Date and Time of Last Print) No
(Type of Camera) FR22
(Print Size) L
(Print Margin) No
(Service Method) Developing and Printing

| | | | | | | |
|---|---|---|---|---|---|---|
| 1 N | 2 N | 3 N | 4 N | 5 N | 6 N | 7 N |
| 8 N | 9 N | 10 P | 11 N | 12 N | 13 N | 14 N |
| 15 N | 16 N | 17 N | 18 P | 19 N | 20 N | 21 N |
| 22 N | 23 N | 24 N | | | | |

162

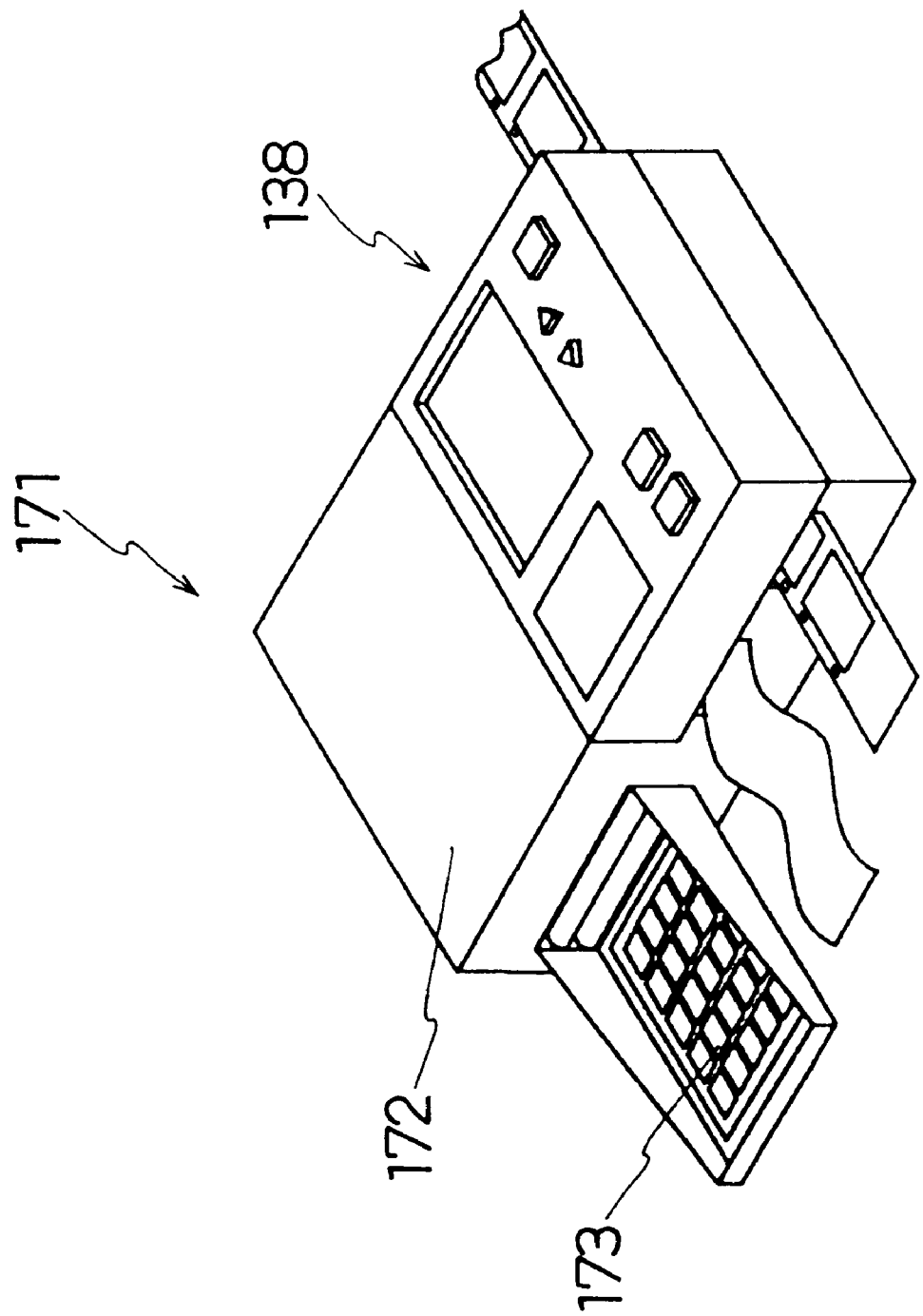

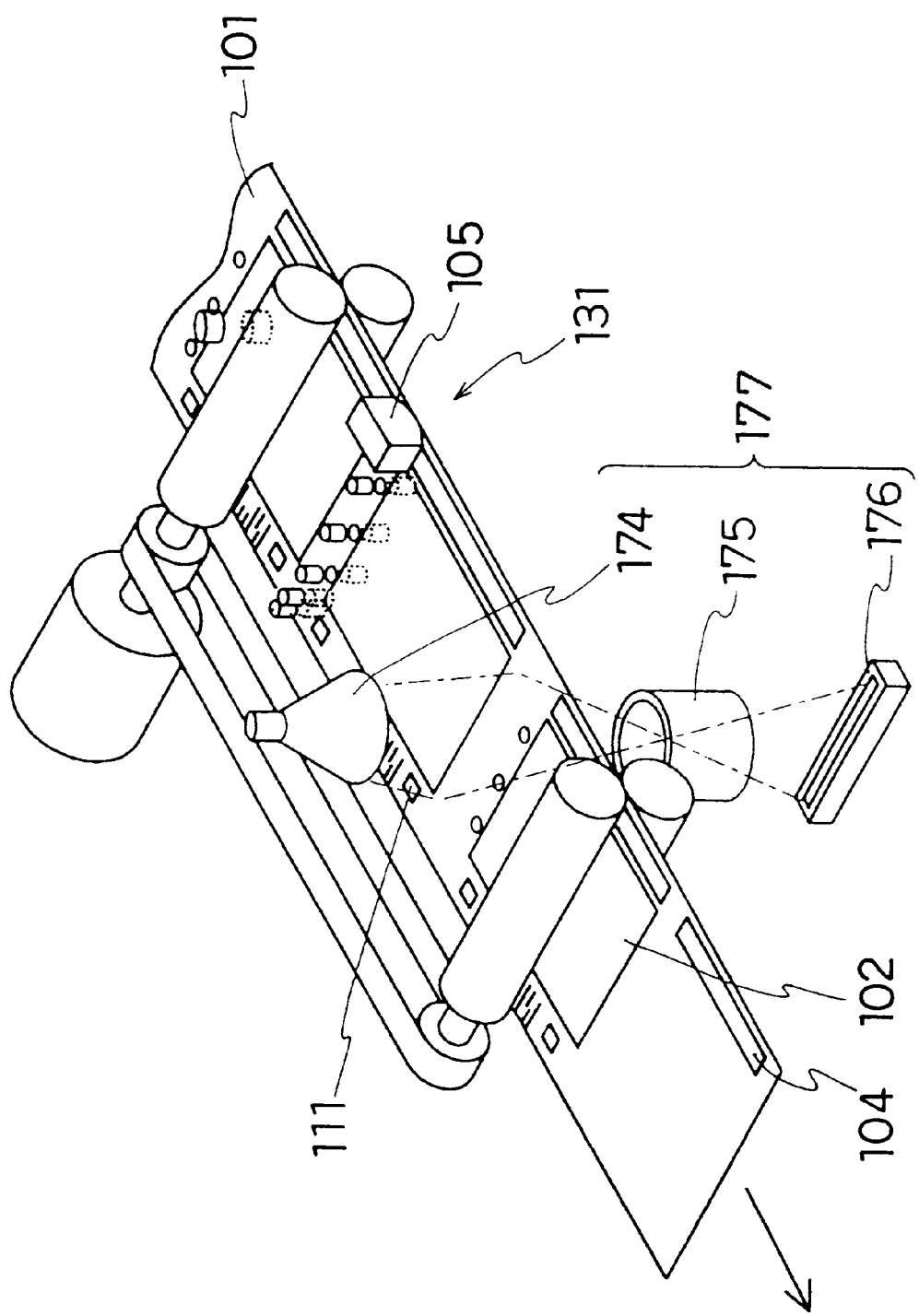

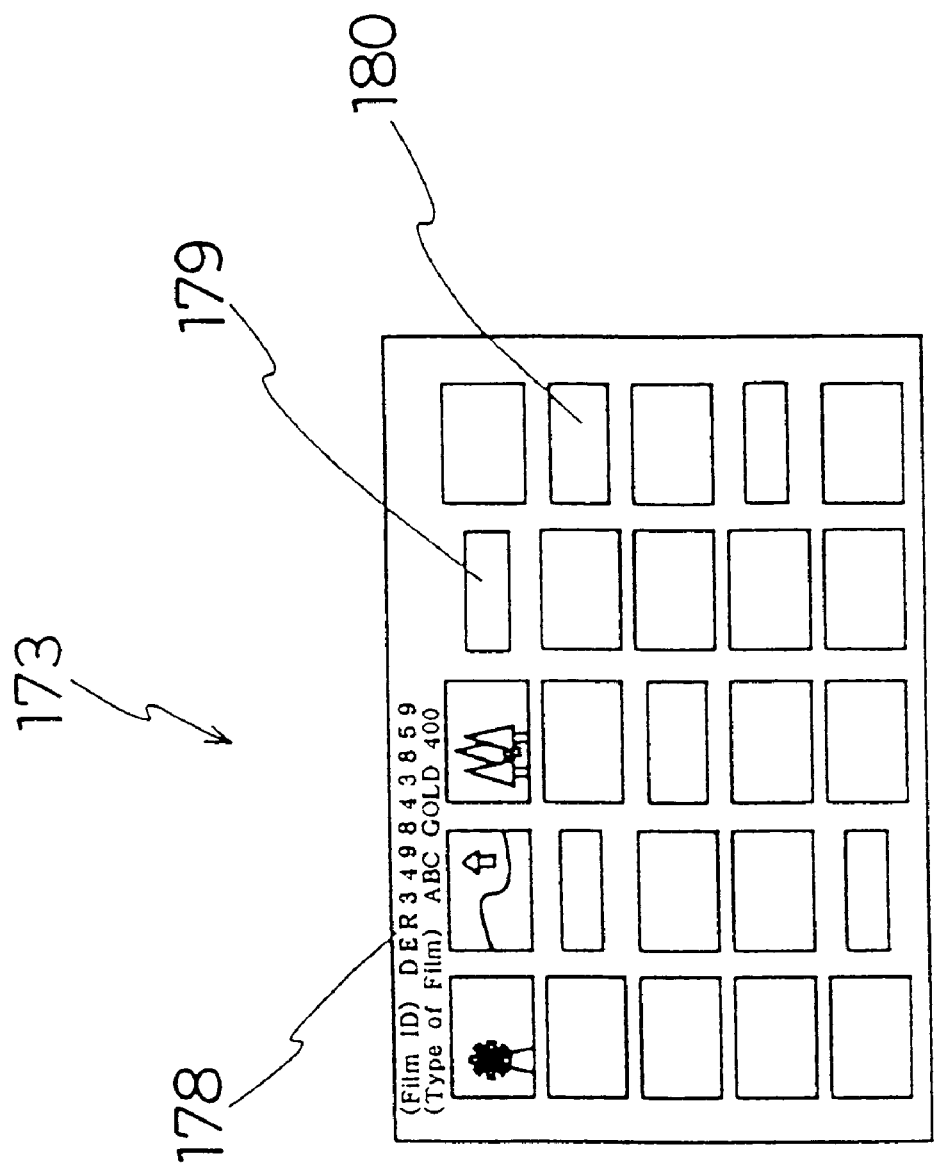

F I G. 25
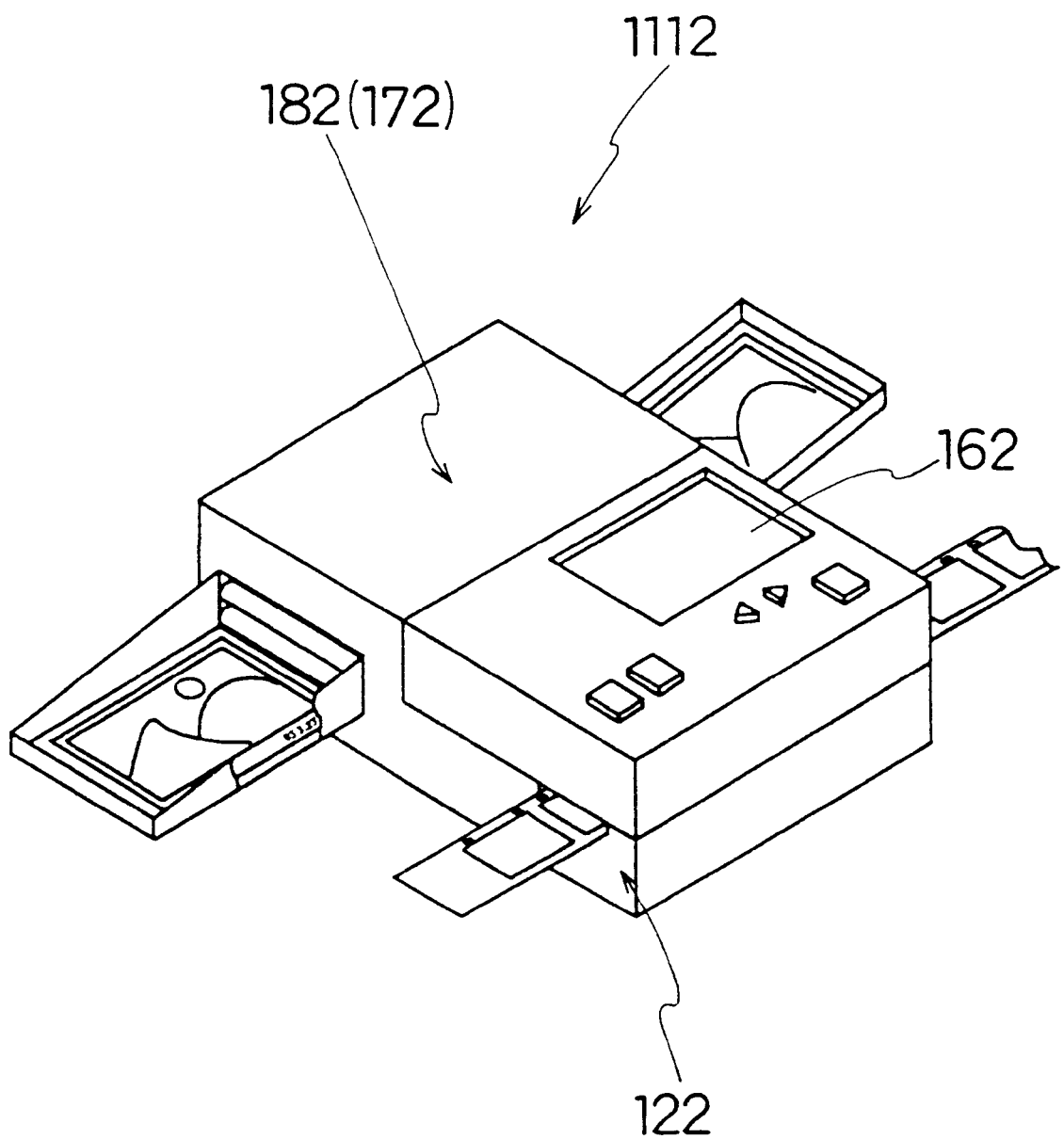

F I G. 26
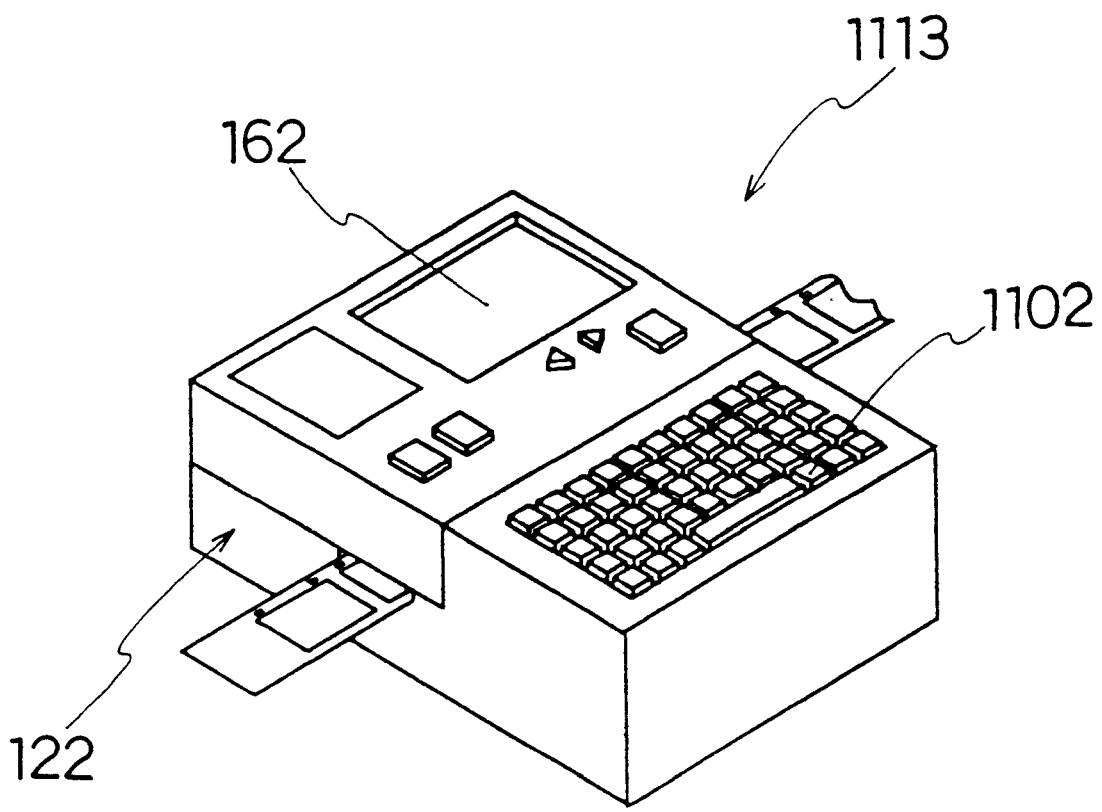

(Film ID) DER3498543859   (Type of Film) ABC GOLD 400

| 1/250 f5.6 RE135 | 1/500 f4.5 RE135 | 1/250 f3.5 RE135 | 1/250 f3.5 RE135 | 1/250 f8 RE135 |
|---|---|---|---|---|
| 93.10.5 10:25 [1] | 93.10.5 10:35 [2] | 93.10.5 10:37 [3] | 93.10.5 10:36 [4] | 93.10.5 10:40 [5] |
| 1/250 f4.5 RE135 | 1/125 f3.5 RE50 | 1/60 f3.5 RE50 | 1/250 f4.5 RE50 | 1/250 f2.8 RE50 |
| 93.10.5 11:45 [6] | 93.10.5 11:47 [7] | 93.10.7 15:15 [8] | 93.10.7 15:17 [9] | 93.10.7 15:18 [10] |
| 1/60 f1.8 RE50 | 1/250 f3.5 RE50 | 1/250 f5.6 RE100-200 | 1/250 f5.6 RE100-200 | 1/250 f5.6 RE100-200 |
| 93.10.7 15:25 [11] | 93.10.7 15:26 [12] | 93.10.12 9:15 [13] | 93.10.12 9:18 [14] | 93.10.12 9:18 [15] |
| 1/250 f5.6 RE100-200 | 1/250 f5.6 RE100-200 | 1/250 f5.6 RE100-200 | 1/250 f5.6 RE100-200 | 1/125 f22 RE28 |
| 93.10.12 9:25 [16] | 93.10.12 9:30 [17] | 93.10.12 9:35 [18] | 93.10.15 9:36 [19] | 93.10.15 16:15 [20] |
| 1/500 f8 RE28 | 1/500 f16 RE28 | 1/250 f5.6 RE28 | 1/250 f4.5 RE50 | 1/60 f1.8 RE50 |
| 93.10.15 16:16 [21] | 93.10.15 16:18 [22] | 93.10.15 [23] | 93.10.15 16:25 [24] | 93.10.15 16:26 [25] |

FIG. 33

(Film ID) DER349843859  (Type of Film) ABC GOLD 400

| Frame NO | S | f | Lens | Date | Time | Character Information |
|---|---|---|---|---|---|---|
| 1 | 1/250 | f5.6 | RE135 | 93.10.5 | 10:25 | Oranda-mura Sightseeing Commemoration |
| 2 | 1/500 | f4.5 | RE135 | 93.10.5 | 10:35 | Oranda-mura Sightseeing Commemoration |
| 3 | 1/250 | f3.5 | RE135 | 93.10.5 | 10:37 | Oranda-mura Sightseeing Commemoration |
| 4 | 1/250 | f3.5 | RE135 | 93.10.5 | 10:36 | Oranda-mura Sightseeing Commemoration |
| 5 | 1/250 | f8 | RE135 | 93.10.5 | 10:40 | Oranda-mura Sightseeing Commemoration |
| 6 | 1/250 | f4.5 | RE135 | 93.10.5 | 11:45 | Mt. Aso Sightseeing |
| 7 | 1/125 | f3.5 | RE50 | 93.10.5 | 11:47 | Mt. Aso Sightseeing |
| 8 | 1/60 | f4.5 | RE50 | 93.10.7 | 15:15 | Mt. Aso Sightseeing |
| 9 | 1/250 | f2.8 | RE50 | 93.10.7 | 15:17 | Mt. Aso Sightseeing |
| 10 | 1/250 | f1.8 | RE50 | 93.10.7 | 15:18 | Mt. Aso Sightseeing |
| 11 | 1/60 | f3.5 | RE50 | 93.10.7 | 15:25 | Mt. Aso Sightseeing |
| 12 | 1/250 | f3.5 | RE50 | 93.10.7 | 15:26 | Mt. Aso Sightseeing |
| 13 | 1/250 | f5.6 | RE100-200 | 93.10.12 | 9:15 | Hakata Dome |
| 14 | 1/250 | f5.6 | RE100-200 | 93.10.12 | 9:18 | Hakata Dome |
| 15 | 1/250 | f5.6 | RE100-200 | 93.10.12 | 9:18 | Hakata Dome |
| 16 | 1/250 | f5.6 | RE100-200 | 93.10.12 | 9:25 | Hakata Dome |
| 17 | 1/250 | f5.6 | RE100-200 | 93.10.12 | 9:30 | Hakata Dome |
| 18 | 1/250 | f5.6 | RE100-200 | 93.10.12 | 9:35 | Hakata Dome |
| 19 | 1/250 | f5.6 | RE100-200 | 93.10.12 | 9:36 | Hakata Dome |
| 20 | 1/125 | f22 | RE28 | 93.10.15 | 16:15 | Kanmon Bridge |
| 21 | 1/500 | f8 | RE28 | 93.10.15 | 16:16 | Kanmon Bridge |
| 22 | 1/500 | f16 | RE28 | 93.10.15 | 16:18 | Kanmon Bridge |
| 23 | 1/250 | f5.6 | RE28 | 93.10.15 | 16:19 | Kanmon Bridge |
| 24 | 1/250 | f4.5 | RE50 | 93.10.15 | 16:25 | Kanmon Bridge |
| 25 | 1/60 | f1.8 | RE50 | 93.10.15 | 16:26 | Kanmon Bridge |

FILM INFORMATION COMMUNICATION APPARATUS, FILM INFORMATION PRINTING APPARATUS, INFORMATION PROCESSING APPARATUS AND INDEX PRINTER

This is a divisional of application Ser. No. 08/403,951 filed Mar. 14, 1995 now U.S. Pat. No. 5,703,701 now allowed.

BACKGROUND OF THE INVENTION

The present invention relates to a film information communication apparatus, a film information printing apparatus, an information processing apparatus, and an index printer. More particularly, the invention relates to a film information communication apparatus capable of reading photographic printing information from a photographic film in which photographic information is recorded, and transmitting the information to a photographic printing apparatus, or the like.

The invention also relates to a film information printing apparatus for mainly reading film information, such as panorama size necessary for printing, the information being recorded in each layer of a photographic film including a photosensitive emulsion layer and a magnetic recording layer, and printing on a recording paper; a film information printing apparatus for printing mainly a date and other information on a reverse side of a printed and developed paper; and an information processing apparatus for processing the information of the magnetic recording layer.

The invention further relates to an index printer for printing the information recorded in each layer of photographic film including a photosensitive emulsion layer and a magnetic recording layer on a reverse side of index print, or the like.

Recently, along with rapid the spread of cameras capable of taking panorama size, photographs corresponding automated printing machines are in an urgent need. That is, since the film for photographs taken in panorama size differs in the printing method, such as enlargement magnification, from normal print, the handling of such film is different from the film produced in normal print only, and it is necessary to classify by asking the customers if panorama size photographs were taken or not. Customers are, however, not always certain as to whether they have taken pictures in panorama size, and in order to offer accurate development and printing services, all pictures must be initially printed in service size, and thereafter checked to determine if panorama size is included or not.

To save such labor, it is proposed to record, together with pictures, the relevant photographic information, such as panorama size, into the film when taking pictures. As the practical method, an optically readable mark such as bar code, is printed in the film with a picture, or a magnetic recording layer is separately provided in the film. In such information recorded film, it is possible to automate printing completely, like in conventional film with only normal sized prints.

Moreover, when a magnetic recording layer is provided in the film, the quantity of recordable information is notably increased, so that not only the printing information, such as panorama size, but also the date of photographing, shutter speed, iris value, zoom value and other photographic information can be recorded.

However, a specific reading device is required for the information thus recorded in the magnetic recording layer, and with wide distribution of such photographic films, a new printing machine with an information reading function must be purchased besides the conventional printing machine. Such printing machine is expensive, and cannot be purchased readily, and hence, printing must be requested of another shop having the machine, which prevents a quick printing service, for example, to finish in an hour.

Besides, if the information that can be recorded when taking pictures cannot be read, it is not utilized effectively.

On the other hand, in a conventional index printer, a picture taken in the photosensitive emulsion layer of the film is read by an image reading mechanism, and pictures of one film are printed in one or plural sheets to make the index print. At this time, frame number and other information are printed on the surface of the index print together with the pictures.

Recently, a film having a magnetic recording layer has been proposed, and in such magnetic recording layer, not only frame number and print format (normal, panorama, or Hi-Vision size), but also character information, such as place and date of photographing, and photographic information, such as shutter speed, iris value and zoom value, can be recorded. Therefore, when all information is printed on the surface of the index print by a thermal transfer printer, or the like, the number of characters printed on the index print wherein a picture per frame is small and hard to see becomes large, thereby making it more difficult to read.

In view of the above circumstances, it is hence an object of the invention to provide a film information communication apparatus capable of reading the printing information recorded on a photographic film, sending the information to a printing apparatus and various printers, and enhancing the efficiency of picture printing and printing service.

It is another object to provide a film information printing apparatus capable of reading and printing the information necessary for printing such a panorama size and service size, or other information, such as date and photographic condition, desired to be written in the print, the information being preliminarily recorded in a photographic film. It is also an object to provide an information processing apparatus capable of editing the information written in the magnetic recording layer of the film.

It is a further object to provide an index printer capable of printing the information preliminarily recorded on a photographic film on at least the reverse side of an index print.

SUMMARY OF THE INVENTION

In accordance with the present invention, there is provided a film information communication apparatus comprising a picture reading mechanism for reading information recorded in a photosensitive emulsion layer, in a photographic film including a photosensitive emulsion layer and a magnetic recording layer, a magnetic recording and reading mechanism for reading information recorded in the magnetic recording layer, a film information reading mechanism for reading information recorded in another portion of the film than the photosensitive emulsion layer and magnetic recording layer, and a communication control mechanism for outputting information for printing read out by each reading mechanism.

It is preferred that printing correction information is written in the photographic film by the magnetic recording and reading mechanism.

It is also preferred that the apparatus has a communication cable for communicating the printing information output from the communication control mechanism to outside.

It is further preferred to print out or display the printing information or the index print information or back print information out of the printing information.

In accordance with the present invention, there is also provided a film information printing apparatus comprising at least one of a mechanism for reading optically readable information preliminarily recorded in a photosensitive emulsion layer in a photographic film including a photosensitive emulsion layer and a magnetic recording layer and mechanism for reading information preliminarily recorded in the magnetic recording medium; and a recording paper printing mechanism for printing the recorded information read by the reading mechanism of the film information on a recording paper.

It is preferred that the apparatus further includes a display mechanism for displaying the information read by the reading mechanism of film information, and it is still more preferred that the apparatus further includes a picture reading mechanism for reading pictures taken in the photosensitive emulsion layer, and an index print mechanism for printing picture data read by the picture reading mechanism in one or plural sheets.

It is moreover preferred that the apparatus includes a paper printing mechanism for printing information read by the reading mechanism of film information on the reverse side and/or surface of the printed and developed paper. The apparatus preferably includes (a) a frame number detecting mechanism for detecting a film frame number preliminarily printed on a reverse side of a paper on which a picture is printed and developed, and (b) a retrieval mechanism for retrieving information from the reading mechanism of film information according to the frame number read by the frame number detecting mechanism, wherein the paper printing mechanism is designed to print the information retrieved by the retrieval mechanism on the reverse side and/or surface of the paper of the corresponding frame number.

In addition, it is preferred that the magnetic recording layer of photographic film is capable of receiving writing, and the apparatus includes a writing mechanism and a keyboard for writing magnetic recording information. It is still more preferred that the magnetic recording layer is capable of receiving writing which is rewritable, and the apparatus further includes an editing mechanism for editing information read by the reading mechanism of magnetic information.

In accordance with the present invention, there is further provided a film information printing apparatus comprising at least one of a mechanism for reading optically readable information preliminarily recorded in a photosensitive emulsion layer in a photographic film including a photosensitive emulsion layer and a magnetic recording layer and mechanism for reading information preliminarily recorded in the magnetic recording medium; and a paper printing mechanism for printing information read by the reading mechanism of film information on a reverse side and/or surface of a printed and developed paper.

It is preferred that the apparatus further includes (a) a frame number detecting mechanism for detecting a film frame number preliminarily printed on a reverse side of a paper on which a picture is printed and developed, and (b) a retrieval mechanism for retrieving information from the reading mechanism of film information according to the frame number read by the frame number detecting mechanism, and the paper printing mechanism is designed to print information retrieved by the retrieval mechanism on a reverse side and/or surface of a paper of a corresponding frame number.

It is preferred that the apparatus further includes a display mechanism for displaying information read by the reading mechanism of film information, and it is still more preferred that the apparatus further includes a picture reading mechanism for reading a picture taken in the photosensitive emulsion layer, and an index print mechanism for printing picture data read by the picture reading mechanism on one or plural sheets.

In addition, it is preferred that the magnetic recording layer of photographic film can receive writing and the apparatus includes a writing mechanism and a keyboard for writing magnetic recording information. It is still more preferred that the magnetic recording layer be such as can receive writing which is rewritable, and the apparatus further includes an editing mechanism for editing information read by the reading mechanism of magnetic information.

In accordance with the present invention, there is still further provided an information processing apparatus comprising: (a) a reading mechanism of magnetic information for reading information preliminarily recorded in a magnetic recording layer, in a photographic film including a rewritable magnetic recording layer, (b) an editing mechanism for editing information read by the reading mechanism of magnetic information, and (c) a writing mechanism for writing information edited by the editing mechanism.

In accordance with the present invention, there is moreover provided an index printer comprising: (a) a picture reading mechanism for reading a picture taken in a photosensitive emulsion layer, in a film including a photosensitive emulsion layer and a magnetic recording layer, (b) an index print mechanism for printing picture data read by the picture reading mechanism on one or plural sheets, (c) a magnetic information recording mechanism for reading out information preliminarily recorded in the magnetic recording layer, and (d) a printing mechanism for printing information read by the magnetic information reading mechanism on at least a reverse side of index print prepared by the index print mechanism.

It is also preferred that the index printer includes an optical information reading mechanism for reading optically readable information preliminarily recorded in the photosensitive emulsion layer.

According to the film information communication apparatus of the present invention, various printing information being directly read from the photographic film is transmitted to an existing printing apparatus to carry out printing, and hence labor is saved in printing adjustment. Accordingly, the printing efficiency is enhanced.

Besides, by connecting with various printers and displays, services to the customers can be enhanced.

In the film information printing apparatus of the present invention, the film information recorded in the photosensitive emulsion layer and/or magnetic recording layer is read by the reading mechanism, and is printed out on a recording paper by the recording paper printing mechanism. When the film information printing mechanism includes a display mechanism, the information can be shown also in the display mechanism.

When the film information printing mechanism includes an index print mechanism, the index print can be also printed. When provided with a paper printing mechanism, the information can be also printed on the reverse side of the printed and developed paper (hereinafter referred to as the photograph). In that case, the film frame number preliminarily printed on the reverse side of the photograph is detected by the frame number detecting mechanism, and the information of the corresponding film frame number is retrieved by a retrieval mechanism, so that the information can be printed on the reverse side of the photograph, or the like.

When further furnished with a writing mechanism and keyboard, information can be newly written into the magnetic recording layer of the film. When provided with an editing mechanism, the information can be edited.

The film information printing apparatus of the present invention can read the information recorded in the photosensitive emulsion layer and/or magnetic recording layer by the information reading mechanism, and print the information on the reverse side of the photograph, or the like, by the paper printing mechanism. In that case, the film frame number preliminarily printed on the reverse side of the photograph is detected by the frame number detecting mechanism, and the information of the corresponding film frame number is retrieved by retrieval means, so that the information is printed on the reverse side of the photograph, or the like. When provided with a display mechanism, the information can be shown on the display mechanism. When provided with an index print mechanism, the index print can be printed. When provided with a writing mechanism and a keyboard, information can be newly written into the magnetic recording layer of the film. The information can be also edited when provided with an editing mechanism.

The information processing apparatus of the present invention reads the recorded information of the film by the magnetic information reading mechanism, edits the recorded information by the editing mechanism, and newly writes the edited information into the magnetic recording layer by the writing mechanism.

The index printer of the present invention reads the picture taken in the photosensitive emulsion layer by the picture reading mechanism, and reads the information recorded in the magnetic recording layer by the magnetic information reading mechanism. The index print mechanism prints the picture read by the image reading mechanism into one or plural sheets, and the printing mechanism prints the information read by the magnetic information reading mechanism on at least the reverse side of the index print.

When furnished with an optical information reading mechanism, the information preliminarily recorded in the photosensitive emulsion layer of the film can be read, and the information can be also printed by the printing mechanism.

BRIEF DESCRIPTION OF THE DRAWINGS

FIG. 9 is an explanatory diagram showing an example of a recording paper;

FIG. 12 is an explanatory diagram of an example of information displayed in the display mechanism in FIG. 11;

FIG. 13 is an explanatory diagram of another example displayed in the display mechanism in FIG. 11;

FIG. 14 is an external perspective view showing still another embodiment of a film information printing apparatus of the present invention;

FIG. 15 is a perspective explanatory diagram showing an example of a reading mechanism of film information having a picture reading mechanism in the present invention;

FIG. 16 is an explanatory diagram showing an example of an index print;

FIG. 25 is an external perspective view showing a further embodiment of a film information printing apparatus of the present invention;

FIG. 26 is an external perspective view showing an embodiment of an information processing apparatus of the present invention;

FIG. 30 is a print example on the surface side of the index print;

FIG. 32 is a print example on the reverse side of the index print;

FIG. 33 is another print example on the reverse side of the index print and;

DETAILED DESCRIPTION

Referring now to the accompanying drawings, a film information communication apparatus (hereinafter referred to communication apparatus), a film information printing apparatus, an information processing apparatus, and an index printer of the present invention are described in detail below.

First, the communication apparatus is described.

Figure 1:
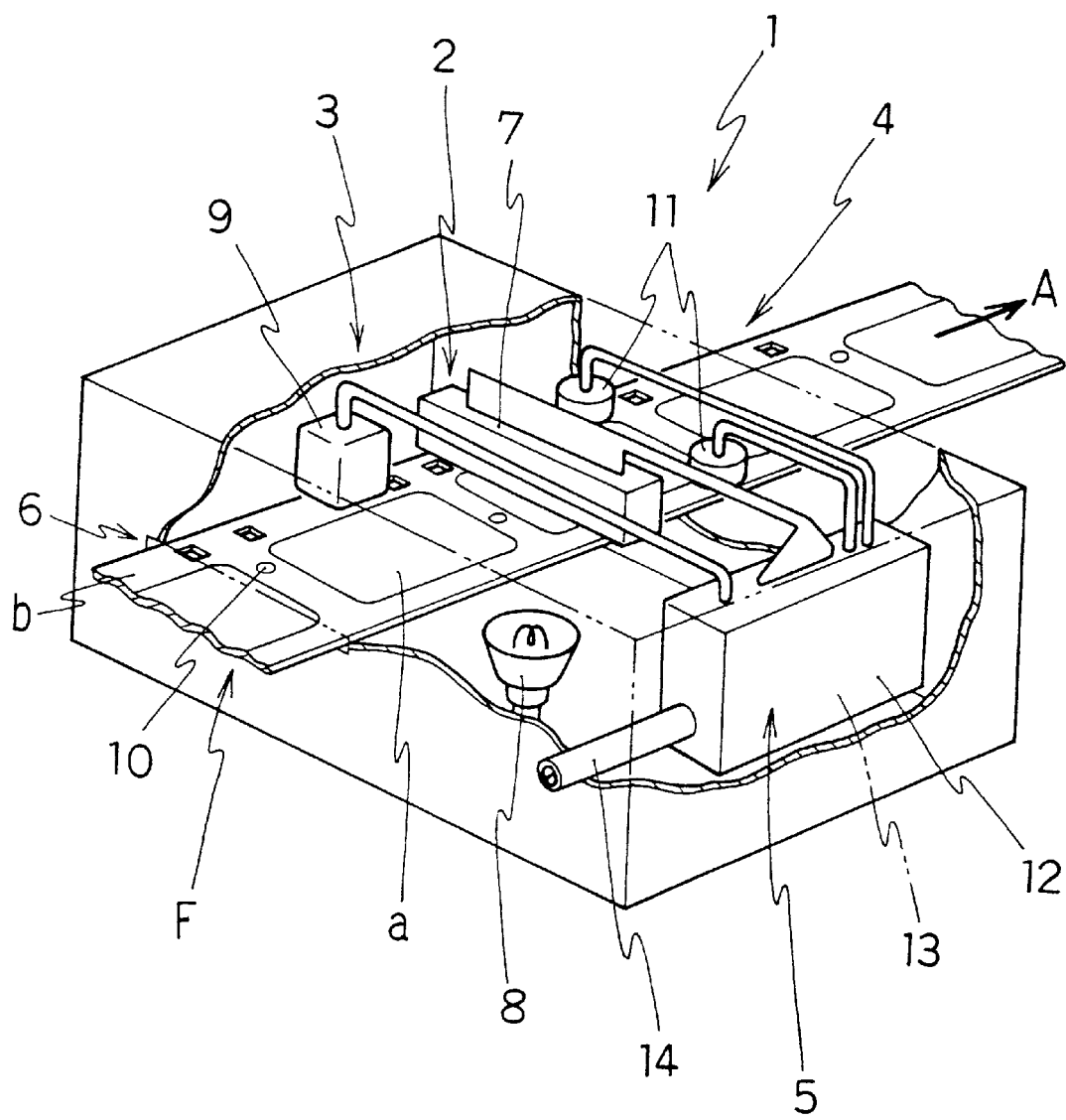
FIG. 1 is a partially cut-away explanatory diagram showing an embodiment of a communication apparatus of the present invention.

As shown in FIG. 1, F denotes a photographic film (hereinafter referred to as film) including a photosensitive emulsion layer a and a magnetic recording layer b, which has been developed after taking a photograph. A communication apparatus 1 of the present invention comprises a picture reading mechanism 2 for reading the information recorded in the photosensitive emulsion layer a, and a magnetic reading and recording mechanism 3 for reading the information recorded in the magnetic recording layer b, a film information reading mechanism 4 for reading the information recorded in such portion of the film other than the photosensitive emulsion layer a and magnetic recording layer b, and a communication control mechanism 5 for outputting information for printing the photograph read out by each reading mechanism.

The film F is inserted from and an inlet 6 of the communication apparatus 1, and is conveyed in the direction of arrow A shown in FIG. 1. This conveying mechanism is not particularly limited, and any known apparatus might be used, for example, a film conveying mechanism of an automatic negative mask comprising a conveying roller and a drive motor or an automatic negative mask for 110 size film comprising a conveying arm and a drive motor might be used.

The picture reading mechanism 2 comprises a CCD camera 7 disposed above a photosensitive emulsion layer a of a film F, and photometric light source 8 disposed below the CCD camera 7 for illuminating the film F from below. The picture information projected from the photometric light source 8 is read by the CCD camera 7. As the picture reading apparatus 2, aside from the CCD camera, a photomultiplier might be also used.

The magnetic recording and reading mechanism 3 comprises magnetic head device 9 disposed above the film F, and reads the information, such as type of light source, shutter speed, iris value, lens used, and position of subject for photographic development recorded on the magnetic recording layer b of the film F by magnetism. Besides, a print size mark 10, such as panorama, wide and service size recorded between pictures in the film by a camera. The information is read by the CCD camera 7 in the picture reading mechanism 2.

The film information reading means 4 comprises CCD cameras 11 disposed at both ends of the film F, and reads the film information, such as type of film, frame number maker, and ISO sensitivity recorded on the film F.

The communication control mechanism 5 incorporates in a box 12 a communication control board 13 composed of current rectifying elements from various reading mechanisms, current amplifying elements, A/D converting elements, communication elements and CPU, and is coupled with each reading mechanism. By the communication control board 13, the information read by each reading mechanism is processed as data for communication, and is transmitted to another device, such as the printing device, through a communication cable 14.

The operation of the communication apparatus 1 of the present invention is described below.

Figure 2:
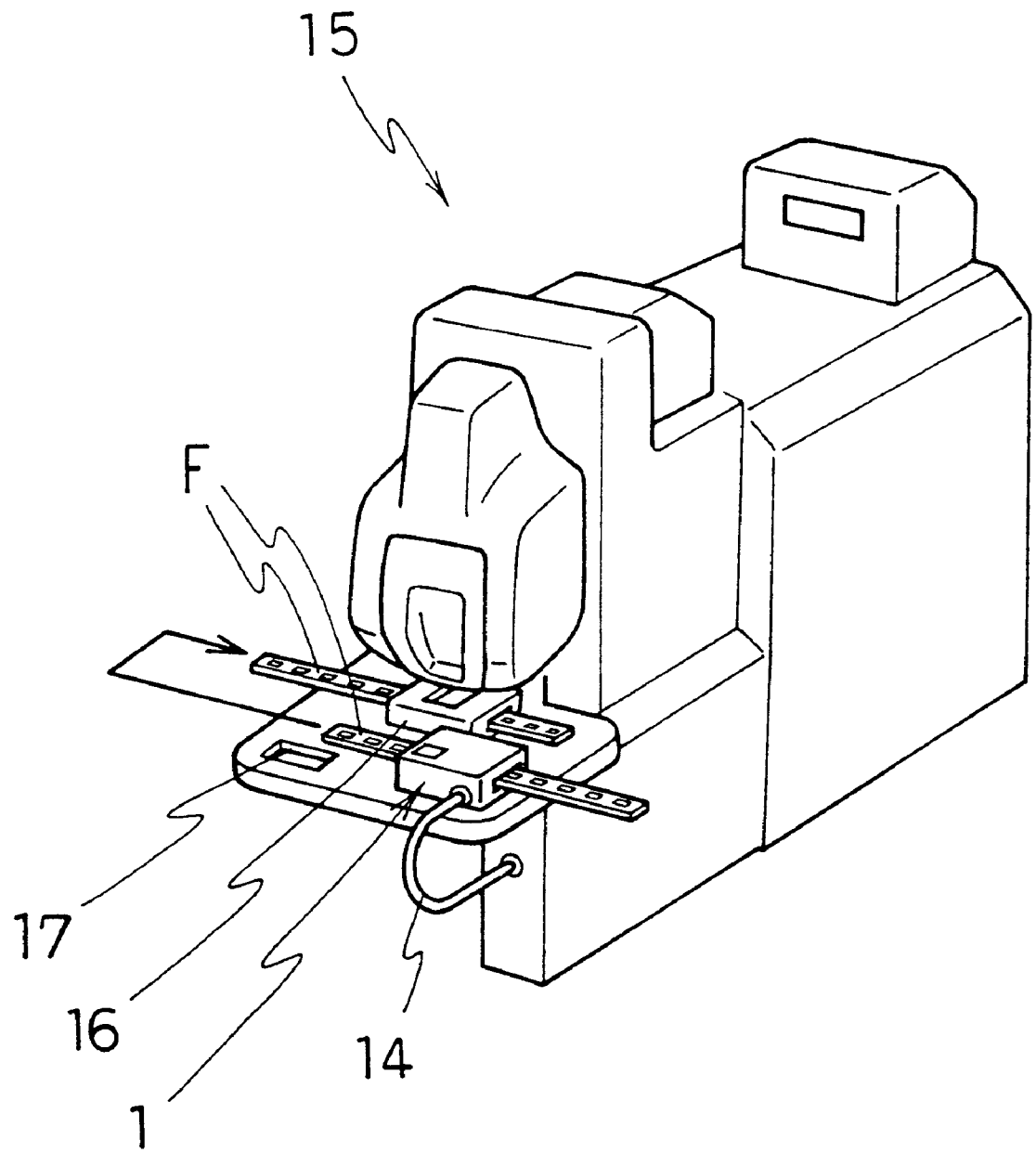
FIG. 2 is an operation explanatory diagram of the communication apparatus in FIG. 1.

As shown in FIG. 2, the communication apparatus 1 is connected with the printing device 15 through the communication cable 14, thereby the printing system is set up.

First, while the film F inserted into the communication apparatus 1 passes through the communication apparatus 1, the information recorded in the film F is read by the picture reading mechanism 2, the magnetic recording and recording mechanism 3, and the film information reading mechanism 4. The read information data is transmitted from the communication control mechanism 5 to the printing device 15, and is once stored in a memory control device, not shown, incorporated in the printing device 14.

The film F processed in the communication apparatus 1 is loaded into an exclusive negative mask 16 for photographic development, and the frame number of the film F is input. The printing information corresponding to the input frame number is picked up from the memory, and is shown in a display 17 of the printing device 15. The operator manipulates the printing device 15 to print the photographs according to the proper setting values shown on the display 17, as for example printing magnification factor suited to print size, such as panorama, wide service size, and correction of printing light source depending on the difference in the photographic light source. It is, hence, not necessary to repeat complicated manipulations for searching proper set values, and the printing efficiency is enhanced. Incidentally, the input of the frame number might be performed by reading the frame number automatically with a frame number detecting device provided in the exclusive negative mask 16. By this automatic input, the memory can be picked up, and the printing device can be operated automatically to print the photograph. As a result, the printing operation is further facilitated.

In the printing process, although the printing information is preliminarily read out from the film F, color correction might be necessary for printing again if the operator judges the color or contrast of the developed photograph to be improper by sense. In the case of such color correction, the film F is loaded again into the communication apparatus 1, and the information of color correction is sent from the memory control device of the printing device 15 to the communication apparatus 1. Consequently, color correction information is written into the recorded portion of the magnetic information of the film F by the magnetic head device 9 of the magnetic recording and reading mechanism 3. The present invention is not limited to writing of color correction information alone, but other correction information, such as print size of panorama, wide or service size and subject position can be also written.

Next, another embodiment of a communication apparatus of the present invention is described below.

Figure 3:
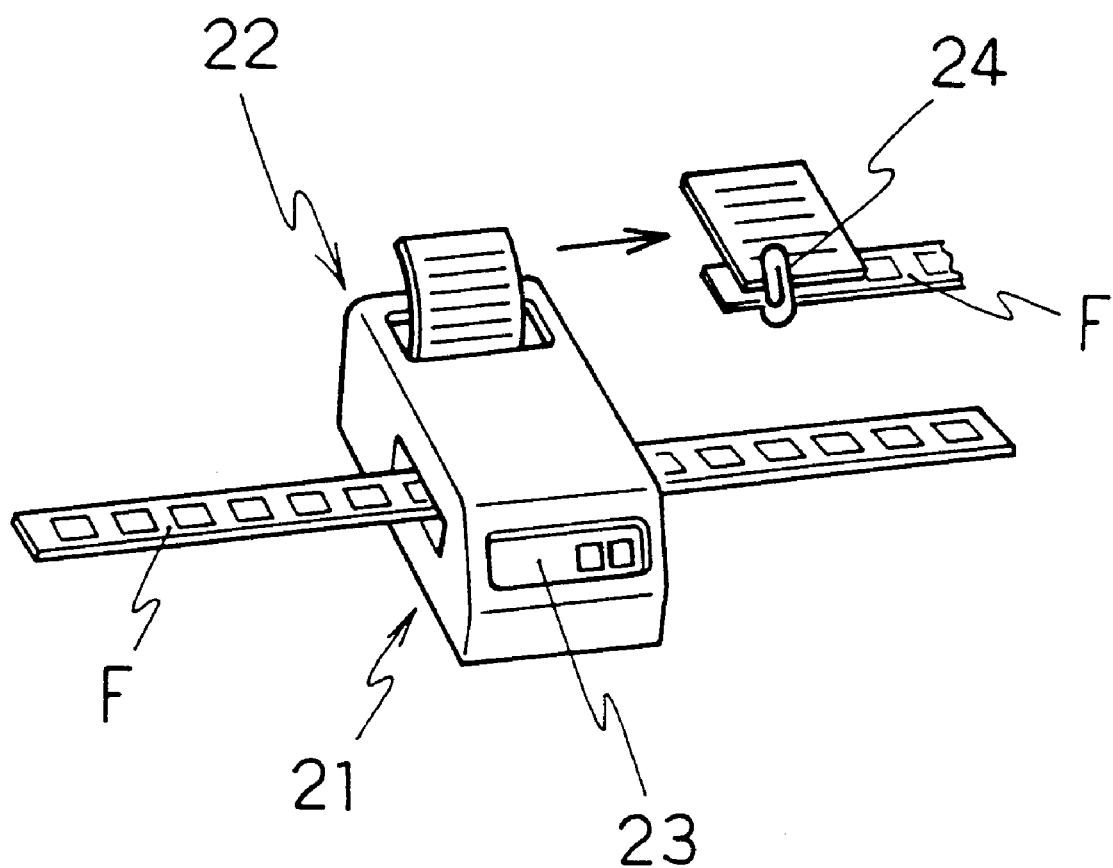
FIG. 3 is a perspective view showing another embodiment of the communication apparatus of the present invention.

As shown in FIG. 3, in a communication apparatus 21, unlike the communication apparatus 1 shown in FIGS. 1 and 2, the output of printing information is carried out by a printer 22 incorporated in the communication apparatus 21.

Applicable examples of printer 22 include, among others, dot impact printer, ink jet printer, laser printer, and thermal printer. The communication apparatus 21 and the printer 22 are operated by an operation panel 23. The printing information of the film F produced from the communication control mechanism 5 of the communication apparatus 21 is printed on an exclusive paper. When reading of the printing information is over, the film F completed of reading and the paper containing the printing information are held by a clip 24, and sent to a printing device which is not shown. Therefore, even in the case of a printing device not capable of reading the magnetic recording of the film F, the photograph can be printed easily and accurately.

In the present embodiment, the printer 22 is built into the communication apparatus 21, but the present invention is not particularly limited thereto, and it might be disposed outside the communication apparatus to achieve communication through a communication cable.

A further embodiment of a communication apparatus of the present invention is described below.

Figure 4:
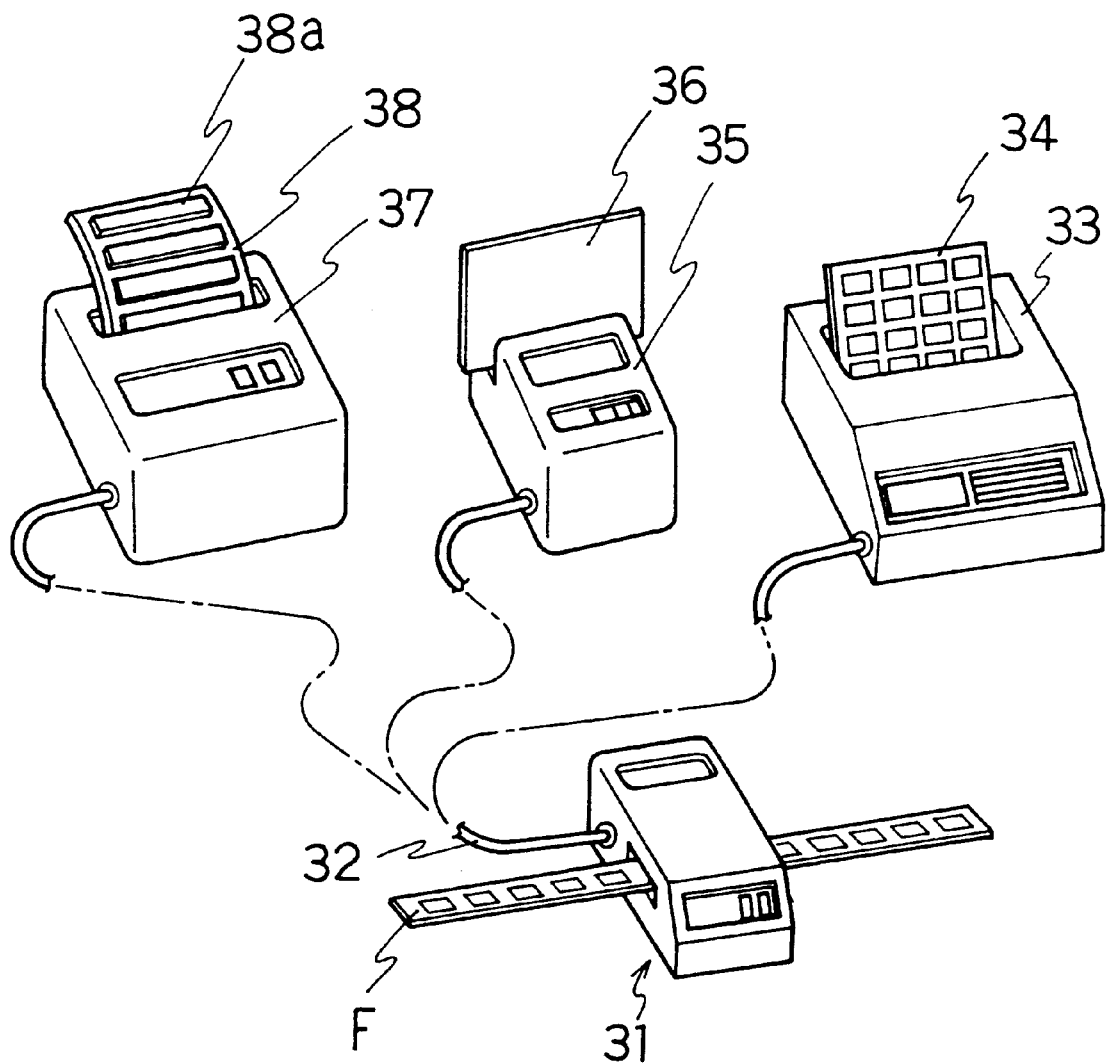
FIG. 4 is a perspective view showing still another embodiment of the communication apparatus of the present invention.

As shown in FIG. 4, a communication apparatus 31 is designed to communicate with various printers, unlike the communication apparatus shown in FIG. 3.

Incidentally, the communication apparatus 31 might not necessarily incorporate the printer in FIG. 3.

The communication apparatus 31 is connected to a thermal dye sublimation transfer type printer 33 through a communication cable 32. Hence, the printing information of the film F read by the communication apparatus 31 is transmitted to the heat sublimate printer 33.

The thermal dye sublimation transfer type printer 33 makes an index print 34 according to the index information sent from the communication apparatus 31. In this index print 34, frame pictures on the film F are sequentially printed on one print, and, therefore, only desired pictures can be ordered for development. The picture printing method in the embodiment is not limited to thermal dye sublimantion transfer method alone, but there might be used other types, such as CRT, liquid crystal and other screen display.

The communication apparatus 31 is connected to a dot impact printer 35 through the communication cable 32 so as to communicate therewith.

In the dot impact printer 35, a printed and developed photograph 36 is installed, and after the frame number is confirmed, the back print information sent from the communication apparatus 31 is printed. The back print information includes the order number, frame number, exposure time and iris value as printing information, light source correction value, date, photo shop name, and others. With this information, sorting of developed photographs, film frame selection for extra printing, and setting of printing information can be carried out efficiently.

Instead of directly printing the back print information on the printed and developed photograph, as mentioned above, the information might be once printed on a seal sheet 38 mounted on a dot impact printer 37 for sheet, and a printed seal 38a might be adhered to the printed and developed photograph. The printing method in the present embodiment is not limited to dot impact system alone, but ink jet system, laser system, or thermal system might be similarly applied.

The communication apparatus 31 in the present embodiment is connected with various printers 33, 35, 37 through the communication cable 32, but the invention is not limited to such arrangement alone, but the communication apparatus and the printer might be combined into one body.

The film information printing apparatus and information processing apparatus of the present invention are described below.

Figure 5:
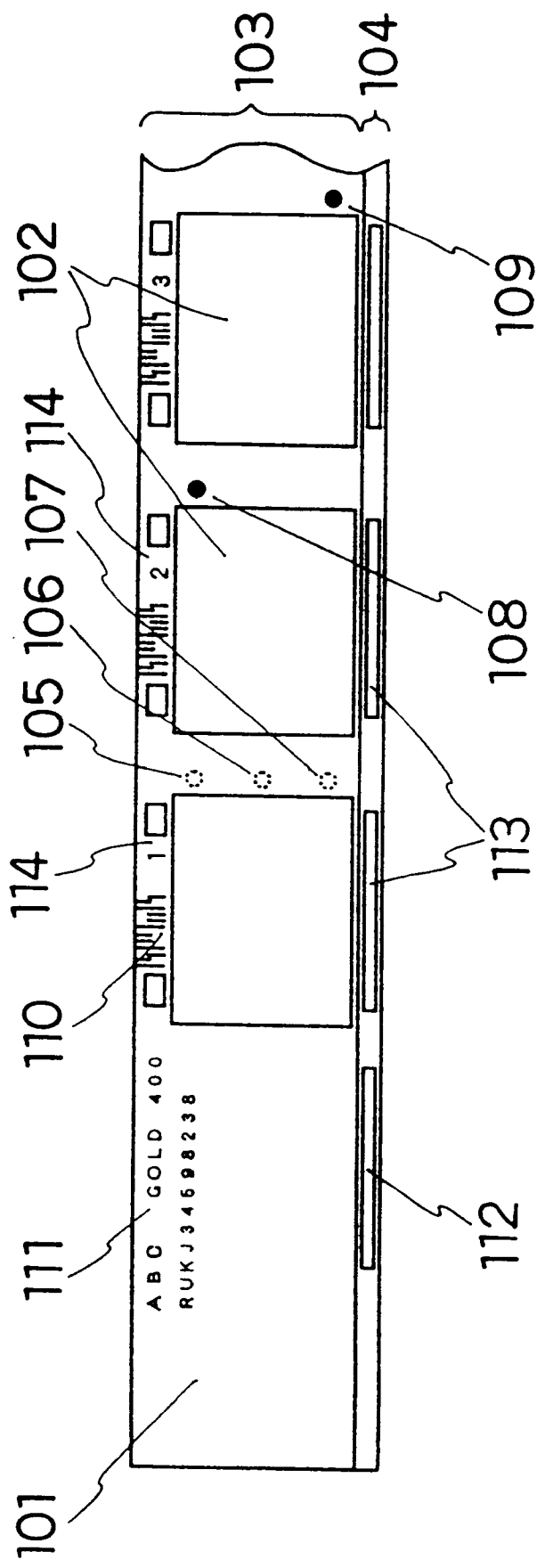
FIG. 5 is an explanatory diagram showing an example of a photographic film including a photosensitive emulsion layer and a magnetic recording layer.

First, an example of a film to which the present invention is applied is described with reference to FIG. 5. A film 101 includes a magnetic recording layer 104, aside from a conventional photosensitive emulsion layer 103 on which a picture 102 is taken. On the photosensitive emulsion layer 103, a bar code 110 has been printed in a factory when manufacturing the film, and optically readable marks 105, 106, 107, 108 and 109 are printed together with the picture by the camera at the time of photographing. On the magnetic recording layer 104, necessary information is recorded by a writing mechanism installed in a film factory, developing laboratory or camera. The recorded information includes various information such as time of making film, taking photograph, accepting at DPE shop, developing, printing, etc.

For example, the type of film, film ID and other information are written at a front end 111 of the film 101, and such general information of film is recorded at a front end 112 in the magnetic recording layer 104, and the photographic information of each picture 102 is recorded at a lower portion 113 of the picture 102. The marks 105, 106, 107 are for designating the print format (to print in normal, panorama or Hi-Vision size), and are printed by the camera by the selection of the operator when photographing. The mark 108 specifies normal print, and the mark 109 specifies panoramic print. In the bar code 110, the type of film, frame number and other information are written. A reference numeral 114 on the picture 102 denotes the frame number.

Examples of information desired to be written into the film at the time of manufacturing film, taking photograph, accepting at DPE shop, developing, and printing are listed below.

The information to be entered when manufacturing film includes the film ID, manufacturing lot number, film type (kind, ISO sensitivity, number of frames, frame number, latitude), date of manufacture, and place of manufacture.

The information to be entered by the camera when taking photograph includes instructions relating to the print format (to print in normal, panarama, or Hi-Vision size), printing method and the like; character information such as place, date and time of taking photograph, shutter speed, iris value, lens used, zoom value, use of strobe, focal length, light source and other photographic circumstances; and back print instruction and front print instruction specify to print such information whether on the surface side or reverse side.

The information to be entered when accepting at DPE shop includes the name, telephone number and ID number of customer, date and time of reception, finishing time (extra-rapid, rapid), date and time of finish, ID of dealer, instruction of dealer, print size, print margin instruction, service method (developing only, or developing and printing), kind of print surface, number of prints, back print instruction, front print instruction, etc.

The information to be entered at the time of developing and printing process includes the name of laboratory of developing and printing, print printer ID, date and time of printing, printed print data (print size, number of prints, print correction information, extra printing information, etc.), comment, and others.

The film information printing apparatus of the present invention is available in a type mainly intended to print the print size and other printing information in the recording paper before printing and to utilize the information when printing, and a type mainly intended to print the information, such as photographing time, on the reverse side of a photograph. The information processing apparatus of the present invention is mainly intended to edit the magnetic information.

Referring first to FIG. 6 to FIG. 10, the film information printing apparatus of the type of mainly printing type printing information on the recording paper is described below.

Figure 6:
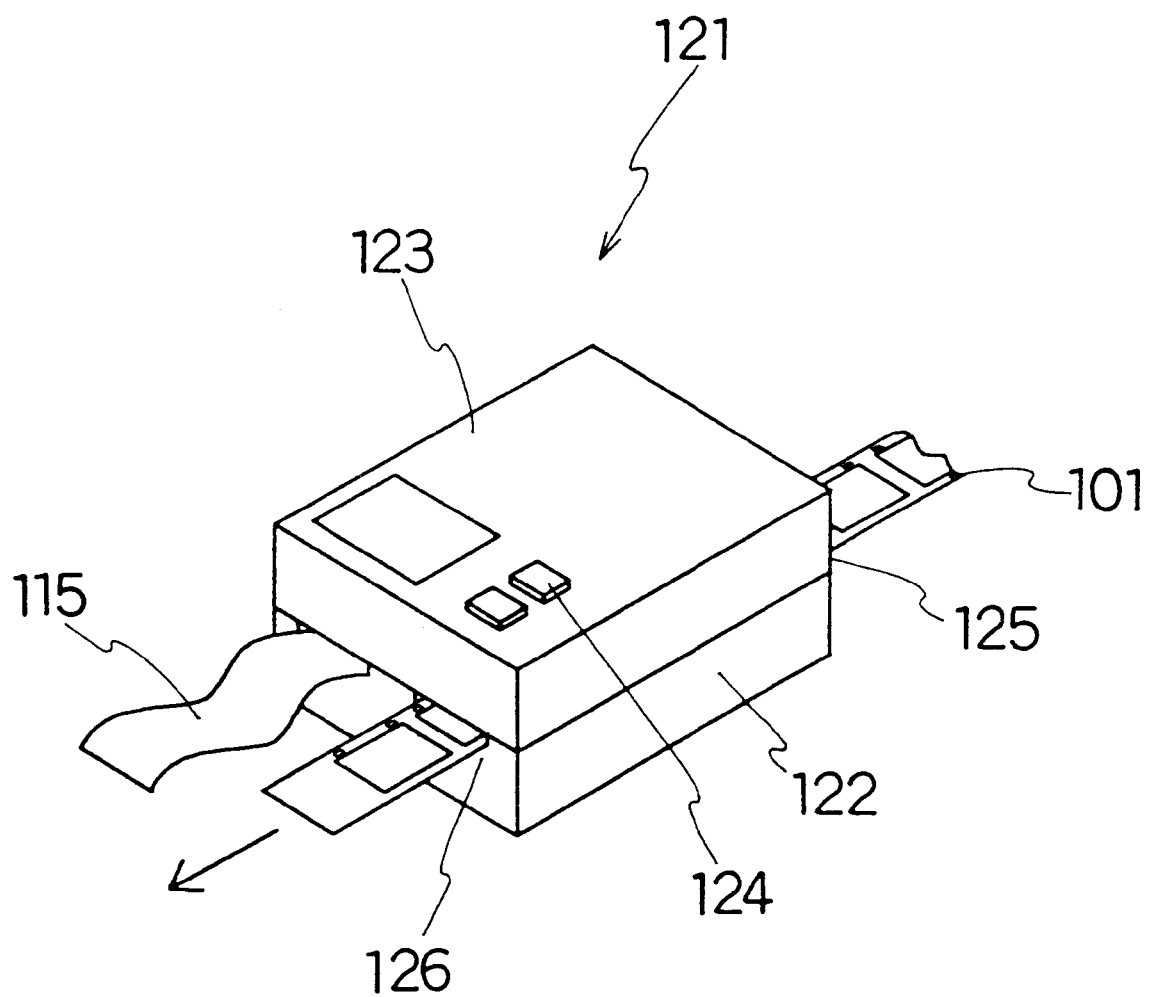
FIG. 6 is an external perspective view showing an embodiment of a film information printing apparatus of the present invention.

FIG. 6 is a perspective view showing the appearance of an embodiment of film information printing apparatus of the present invention. The film information printing apparatus 121 comprises a film information reading unit 122 and an information printing unit 123. The film information reading unit 122 reads the information recorded in the photosensitive emulsion layer 103 or magnetic recording layer 104. It is preferred to read the recorded information in both photosensitive emulsion layer 103 and magnetic recording layer 104, but it might be designed to read either one only from the viewpoint of the cost. The read information is printed on the recording paper 115 by the information printing unit 123. Reference numeral 124 is a print mode changeover switch, 125 is a film inlet, and 126 is a film outlet.

Figure 7:
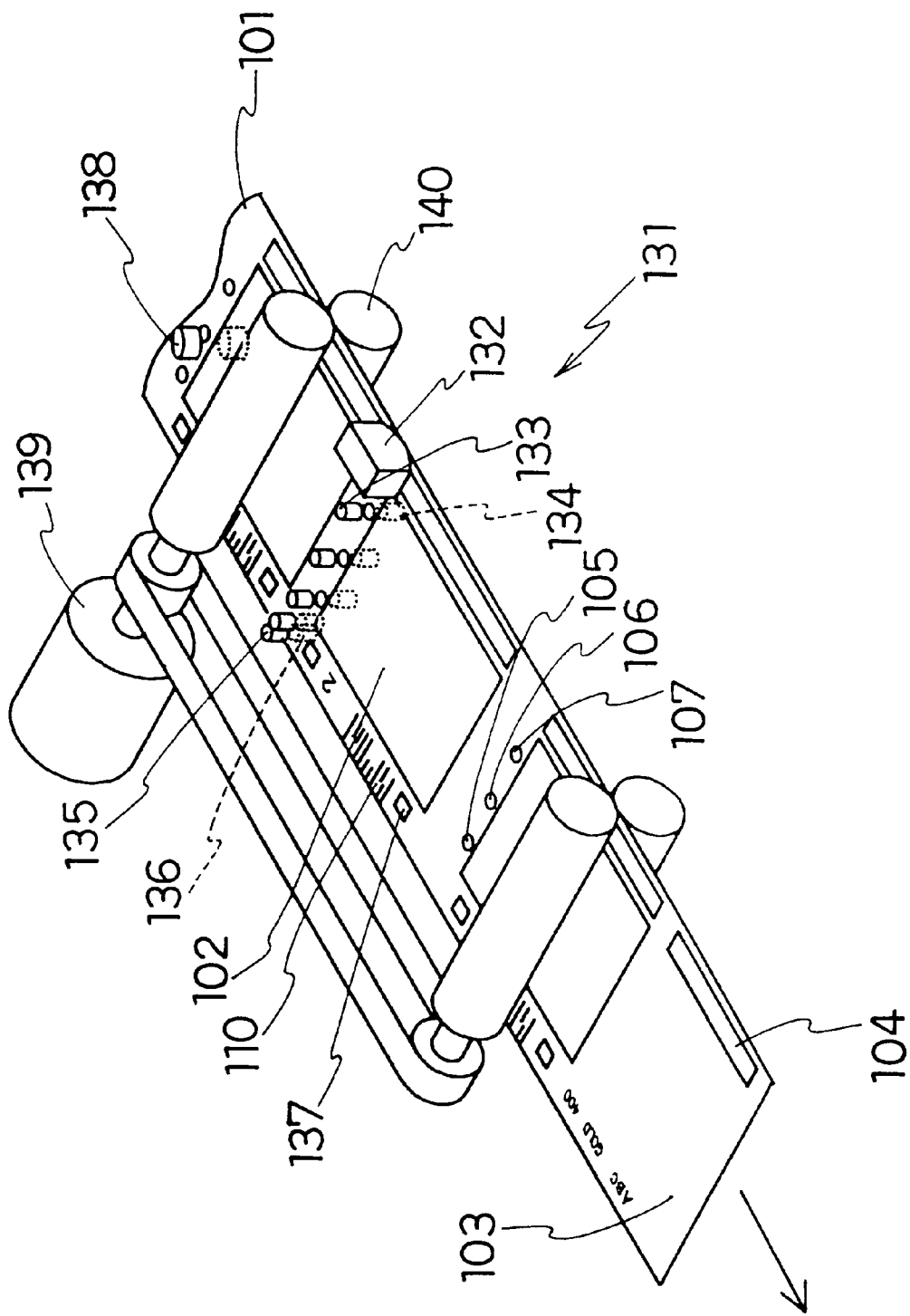
FIG. 7 is a perspective explanatory diagram showing an example of a reading mechanism of film information in the present invention.
Figure 8:
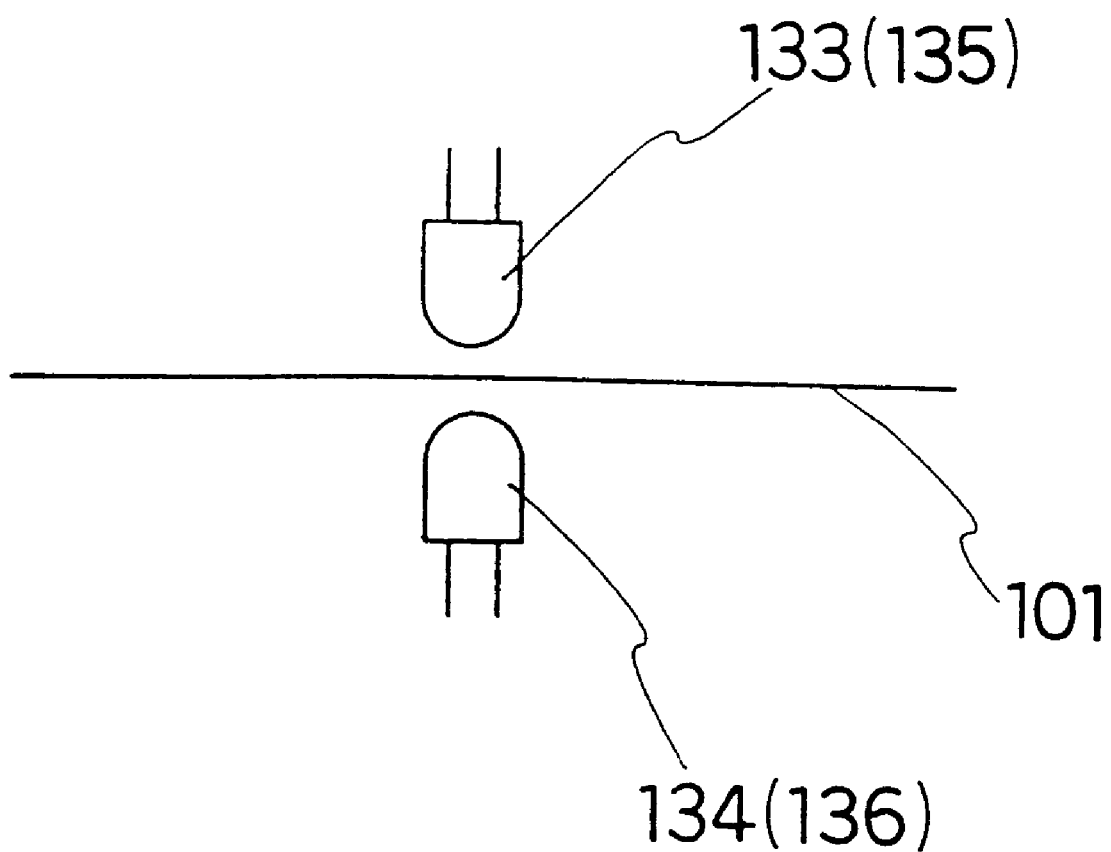
FIG. 8 is an explanatory side view of FIG. 7.

FIG. 7 shows an example of film information reading mechanism 131 capable of reading recorded information of both photosensitive emulsion layer 103 and magnetic recording layer 104, which is disposed inside the film information reading unit 122 in FIG. 6. Reference numeral 132 is a magnetic head for reading the record in the magnetic recording layer 104, and 133 to 136 are sensors or light emitting diodes for reading the record in the photosensitive emulsion layer 103. That is, reference numerals 133 and 134 are respectively format sensor and first light emitting diode for reading marks 105 to 107 recording respective print sizes, and 135 and 136 are respectively bar code sensor and second light emitting diodes for reading bar code 110. The sensors 133, 135 and light emitting diodes 134, 136 are provided at positions for supplying or receiving the light across the film 101 as shown in FIG. 8. When the light is shielded by the mark 105 and 107 and bar code 110, the sensors 133, 135 detect such shielding of light. Reference numeral 137 is a perforation, which is used for positioning the screen when photographing with a camera.

Reference numerals 138 to 140 are film conveying mechanisms, and when the film 101 is inserted into the film inlet 125 shown in FIG. 6, a film detection sensor 138 detects the film 101 to rotate a motor 139, and the film 101 is conveyed by a film feed roller 140, and the film 101 is sent out into the film outlet 126 shown in FIG. 6.

The recorded information in the magnetic recording layer 104 is converted into electric signals by being passed through the magnetic head 132, and transmitted to a control unit described later. The optically readable information detected by the sensors 133, 135 is similarly converted into electric signals, and is also transmitted to a control unit. In the information printing unit 123, the information is printed in a print mode selected by the print mode changeover switch 124. As the recording paper printing mechanism for composing the information printing unit 123, dot impact printing using ink ribbon, ink jet printing, laser printing, or thermal printing might be employed.

Figure 10:
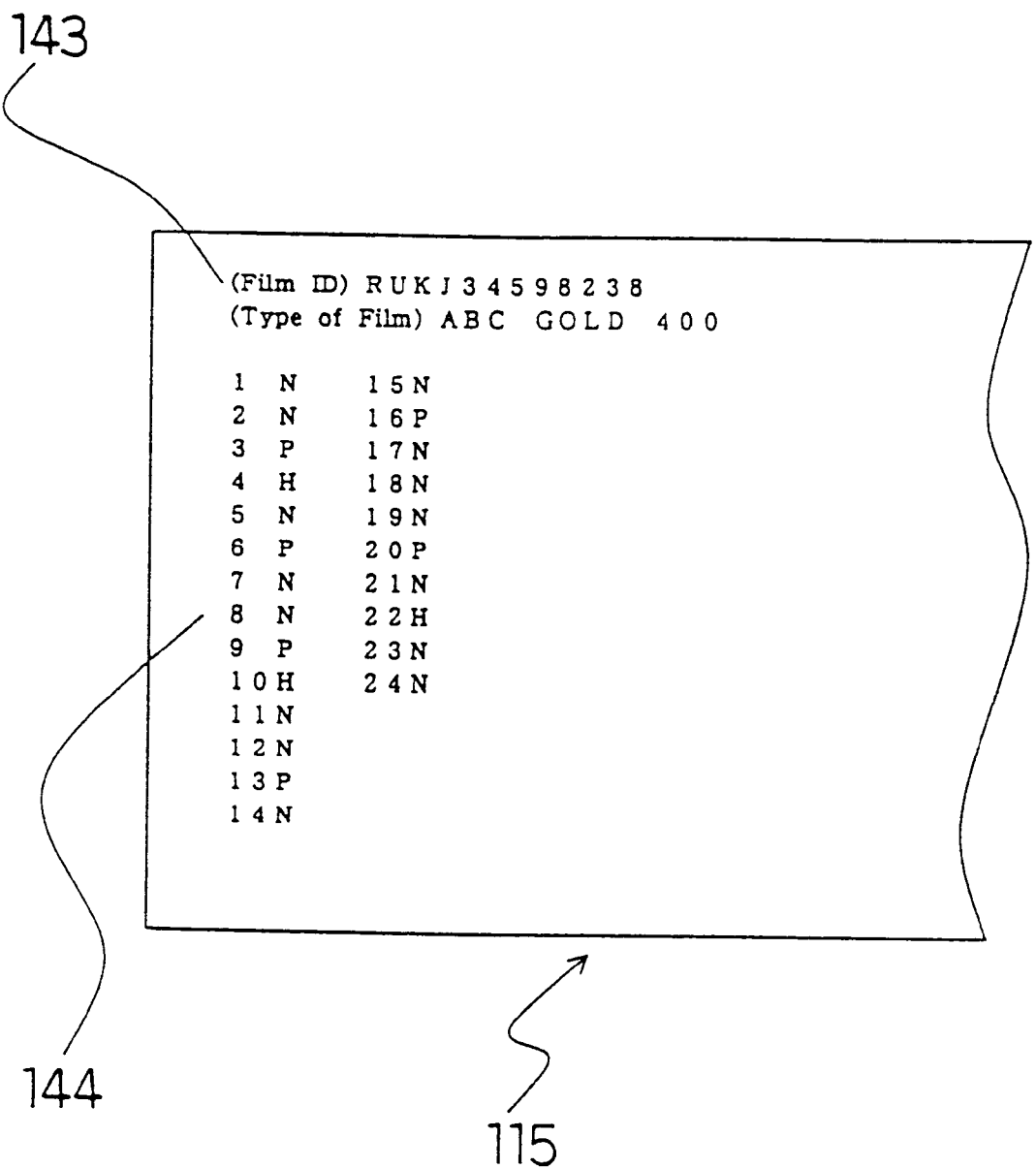
FIG. 10 is an explanatory diagram showing another example of a recording paper.

FIG. 9 and FIG. 10 show examples of information recorded in the recording paper 115. The left side 141 shown in FIG. 9 indicates the information of the entire film, and the succeeding right side 142 indicates the information of each picture 102. The information of the entire film includes the film ID, ISO or other print type, customer information, type of camera used, requirement of index print, service method such as simultaneous print and extra print, inclusion of panorama size, etc., and the information of each picture 102 includes the frame number, number of prints, print size, place of photographing, photographic situation, and other information.

In FIG. 10, the top 143 shows the recorded information of the entire film 101, such as film ID and film type, and the bottom 144 denotes the recorded information of each picture. For example, N stands for normal print, P for panorama print, and H for Hi-Vision print. Whether the information to be recorded in the recording paper 115 is expressed as shown in FIG. 9 or as shown in FIG. 10 might be selected by the print mode changeover switch 124.

Figure 11:
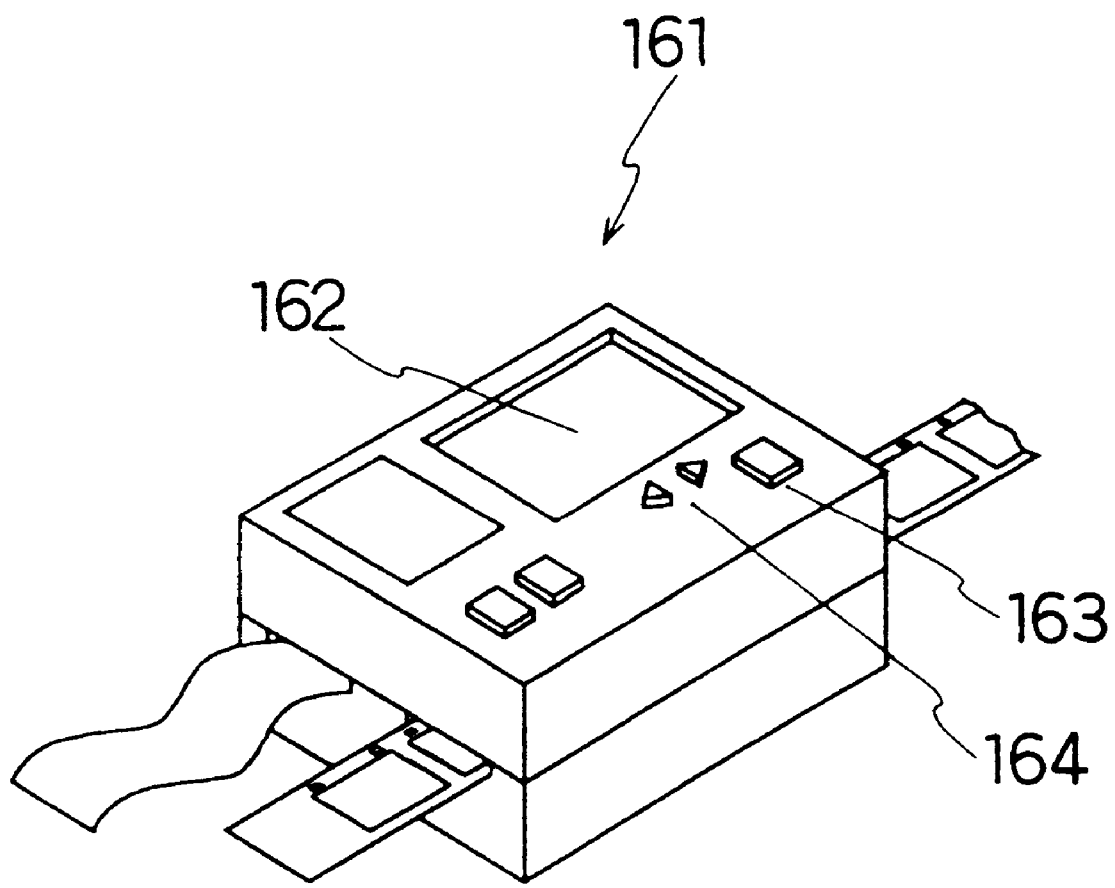
FIG. 11 is an external perspective view showing another embodiment of a film information printing apparatus of the present invention.

FIG. 11 shows still another embodiment of the film information printing apparatus of the present invention. The film information printing apparatus 161 in FIG. 1 is realized by attaching a monitor 162 as display mechanism to the film information printing apparatus 121 in FIG. 6. The monitor 162 displays the information as shown in FIG. 12 or FIG. 13. Besides, a display mode changeover switch 163 and a scroll switch 164 are provided to change over the display mode or scroll the information of each picture.

FIG. 12 shows an example of recorded information displayed in the monitor 162. In a frame 165, the information of the entire film is shown, and the information of each screen in its lower part 166 can be scrolled by the scroll switch 164. FIG. 13 shows other display mode. The display modes are changed over the display mode changeover switch 163.

As the monitor 162, a liquid crystal device or CRT can be used.

A yet further embodiment of the film information printing apparatus realized by providing the film information printing apparatus 161 in FIG. 11 with an index print mechanism is explained below with reference to FIG. 14. Incidentally, it is also possible to install an index print mechanism in the film information printing apparatus 121 shown in FIG. 6 which does not incorporate the display mechanism (monitor 162).

In FIG. 14, as the index printer 172 to be provided in the film information printing apparatus 171, a printer of thermal dye siblimation transfer method is preferred from the viewpoint of picture quality and size, but this is not absolute and printers of ink jet type or dry process silver halide photography might be also employed. Reference numeral 173 is an index print.

Referring to FIG. 15, the inside of the film information printing apparatus 171 is described. What differs from the apparatus in FIG. 7 and FIG. 8 is that a lamp 174, a lens 175, and a line CCD 176 for composing a picture reading mechanism 177 are provided in the film information reading mechanism 131. The picture 102 on the film 101 is read by the line CCD 176, and the read picture data is printed on one or plural sheets. At this time it is also possible to print together with the information read by the film information reading mechanism 131.

FIG. 16 shows an example of a thus made index print 173. In the upper part 178 of the index print 173, a part of the recorded information reading the information of the entire film and others is printed. Each picture can be printed out in a suited print format on the basis of the recorded information read. For example, reference numeral 179 indicates a panoramic size photograph, and 180 is a Hi-Vision size photograph. Thus, in the film information printing apparatus 171 provided with an index printer 172, not only the picture but also a part of recorded information converted into characters can be printed on the index print 173.

FIGS. 17 to 20 relate to another embodiment of the film information printing apparatus of the present invention realized by providing the film information printing apparatus 161 in FIG. 11 with a paper printing mechanism. It is also possible to incorporate the paper printing mechanism in the film information printing apparatus 121 shown in FIG. 6 without display mechanism (monitor 162). Further, the paper printing mechanism can be also incorporated in the film information printing mechanism 171 having the index print mechanism shown in FIG. 14.

Figure 17:
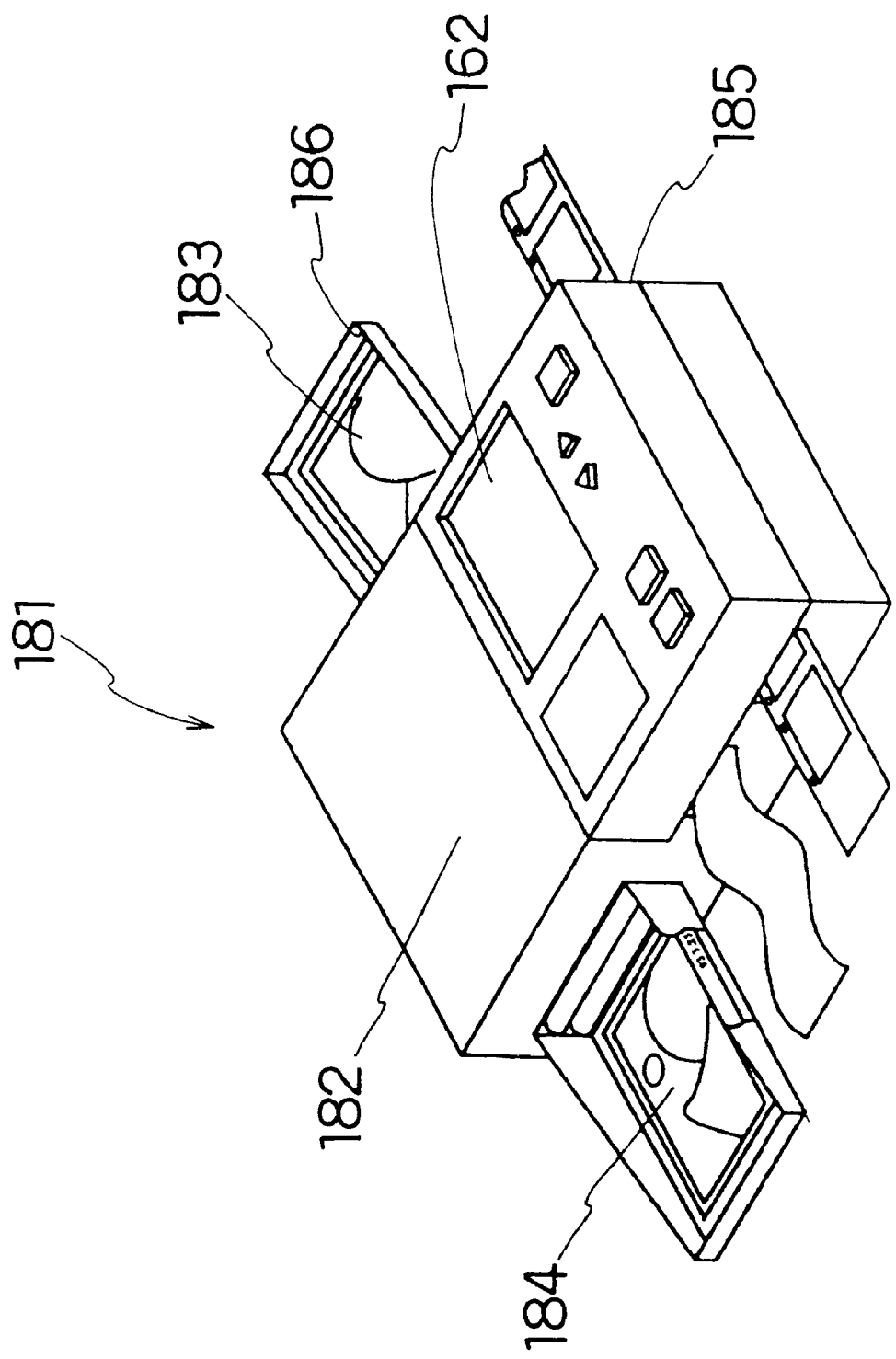
FIG. 17 is an external perspective view showing yet still another embodiment of a film information printing apparatus of the present invention.

In FIG. 17, the film information printing apparatus 181 includes a paper printing unit 182. Reference numeral 183 shows a photograph before printing, and 184 denotes a photograph after printing.

Figure 18:
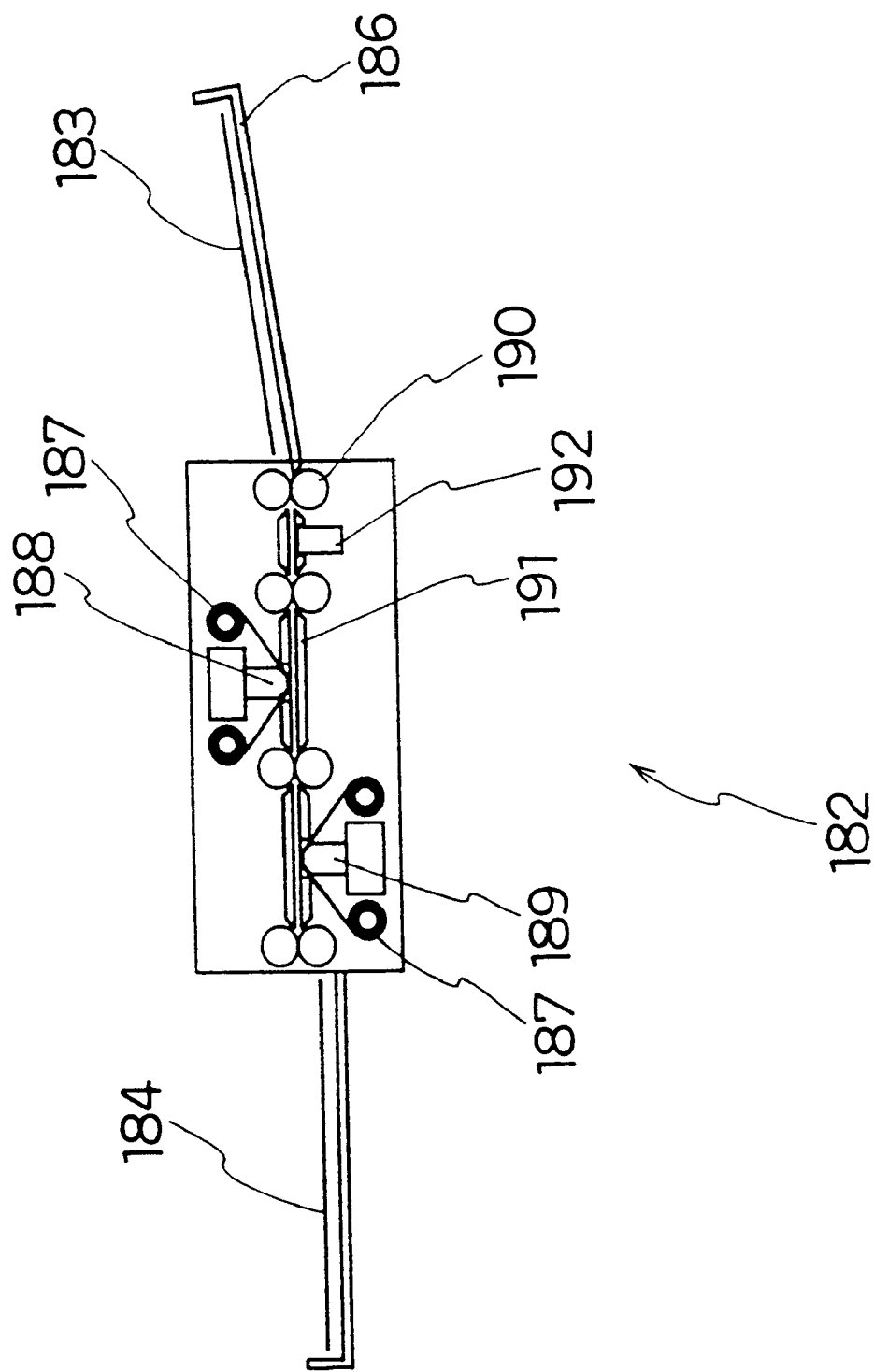
FIG. 18 is an explanatory side view showing a paper printing mechanism of the present invention.

The constitution of the paper printing unit 182 is described based on FIG. 18. In printing, dot impact printing using an ink ribbon or the like might be employed. Reference numeral 187 show an ink ribbon, and 188 is a printing head for printing on the surface side of a photograph, and 189 is a printing head for printing on the reverse side of a photograph. Either one of the printing heads 188, 189 might be provided. When printing on the surface side of the photograph, a white margin is needed, so that it is preferred to use the printing head 189 for printing on the reverse side of the photograph. Reference numeral 190 is a paper feed roller, and 191 is a paper guide.

The manipulating method of the paper printing unit 182 is described below. First, the photograph to be printed and its film are prepared, and the film 101 is inserted into the film inlet 185. Then, the recorded information on the film 101 is read, and the information is stored in the memory. Next, by referring to the frame number 193 (refer to FIG. 19) printed on the reverse side of the photograph by the printing apparatus, photographs are inserted into a photograph inlet one by one from the smallest frame number, and the stored information is read out from the memory from the smallest frame number, and printed on the reverse side, surface or both sides of the inserted photographs.

In the case of the film information printing apparatus 181 having the monitor 162, the frame number desired to be printed is read out in the minotor 162, and the photograph of the displayed frame number might be inserted into the photograph inlet 186 to be printed.

In the film information printing apparatus 181 of the present invention, moreover, by incorporating a frame number detection sensor 192 shown in FIG. 18 and a retrieval mechanism (not shown), the information necessary for the desired photograph can be printed more easily. That is, without having to insert a photograph into the photograph inlet 186 from the smallest frame number, the frame number detection sensor 192 reads the frame number 193, and the retrieval mechanism searches the information of that number, thereby the corresponding information is printed on the photograph.

Figure 19:
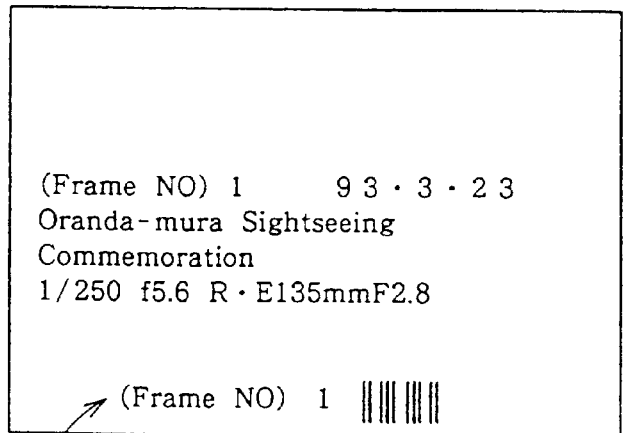
FIG. 19 is an explanatory diagram showing an example of information printed on a reverse side of a photograph.
Figure 20:
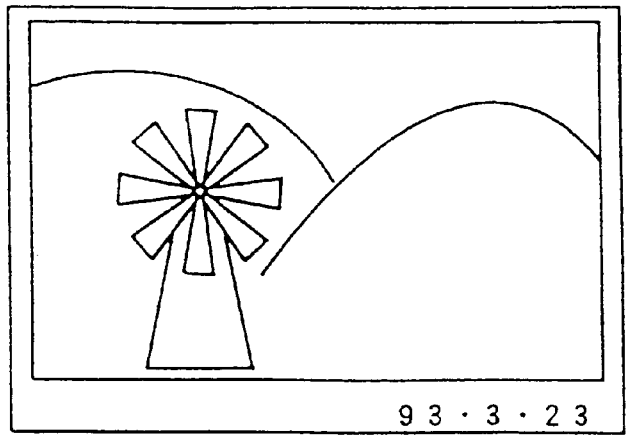
FIG. 20 is an explanatory diagram showing an example of information printed on a surface side of a photograph.

FIG. 19 and FIG. 20 show examples of information printed by the paper printing mechanism. FIG. 19 shows the reverse side of a photograph, and FIG. 20 shows the surface side. In the lower part of the reverse side of the photograph, the frame number 193 is printed by a printing apparatus by a conventional method. In the upper part, date of photographing, character information, and photographic conditions are printed by the paper printing mechanism. As shown in FIG. 20, date of photographing might be printed below the picture of the surface side of the photograph.

A still further embodiment of the film information printing apparatus of the present invention is described with reference to FIGS. 21 and 22. This film information printing apparatus 1101 is realized by providing the film information printing mechanism 161 in FIG. 11 with a keyboard 1102 and a writing mechanism (refer to FIG. 22). It is also possible to incorporate the keyboard 1102 and writing mechanism (refer to FIG. 22) in the film information printing apparatus 121 shown in FIG. 6) without display mechanism (monitor 162), or it is further possible to incorporate the keyboard 1102 and writing mechanism (see FIG. 22) in the film information printing apparatus 171 with index printer 172 in FIG. 14, or in the film information printing apparatus 181 with paper printing unit 182 in FIG. 17. In FIG. 23, the keyboard 1102 and writing mechanism (refer to FIG. 22) are incorporated in the film information printing apparatus 181 in FIG. 17.

Figure 21:
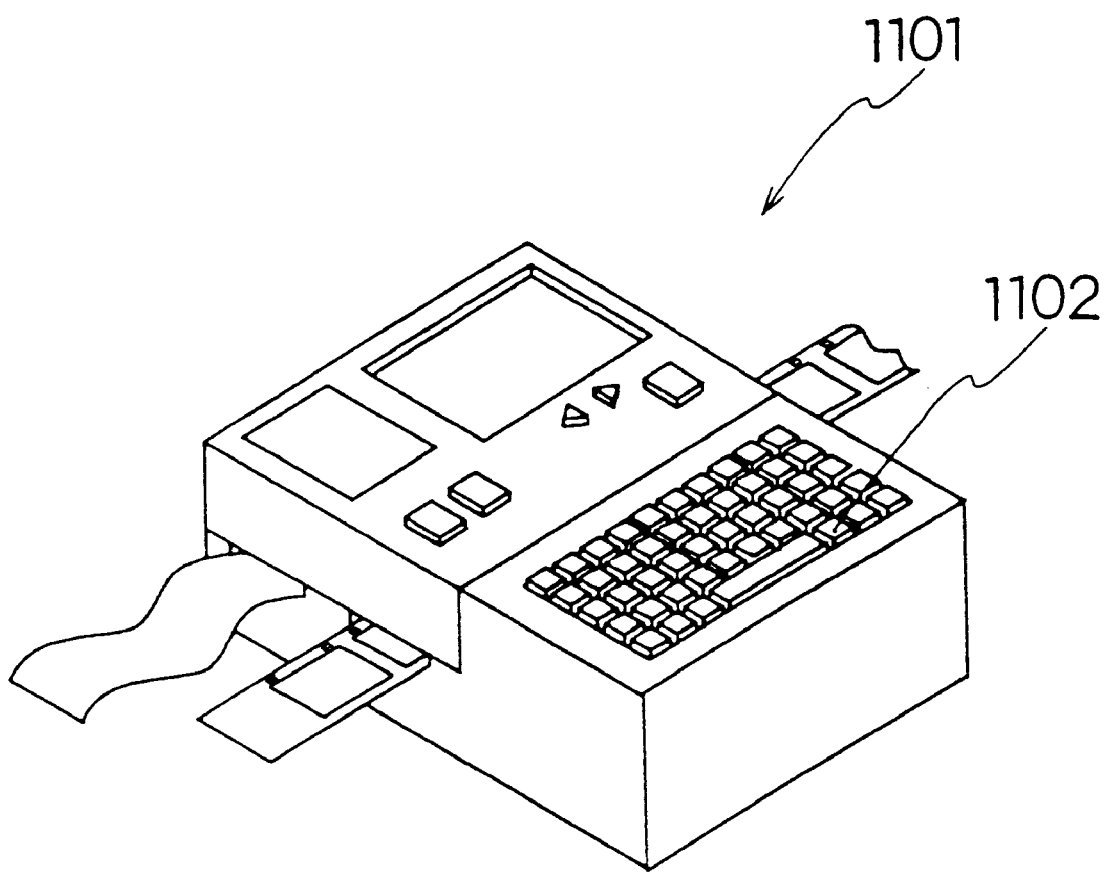
FIG. 21 is an external perspective view showing a further embodiment of a film information printing apparatus of the present invention.
Figure 22:
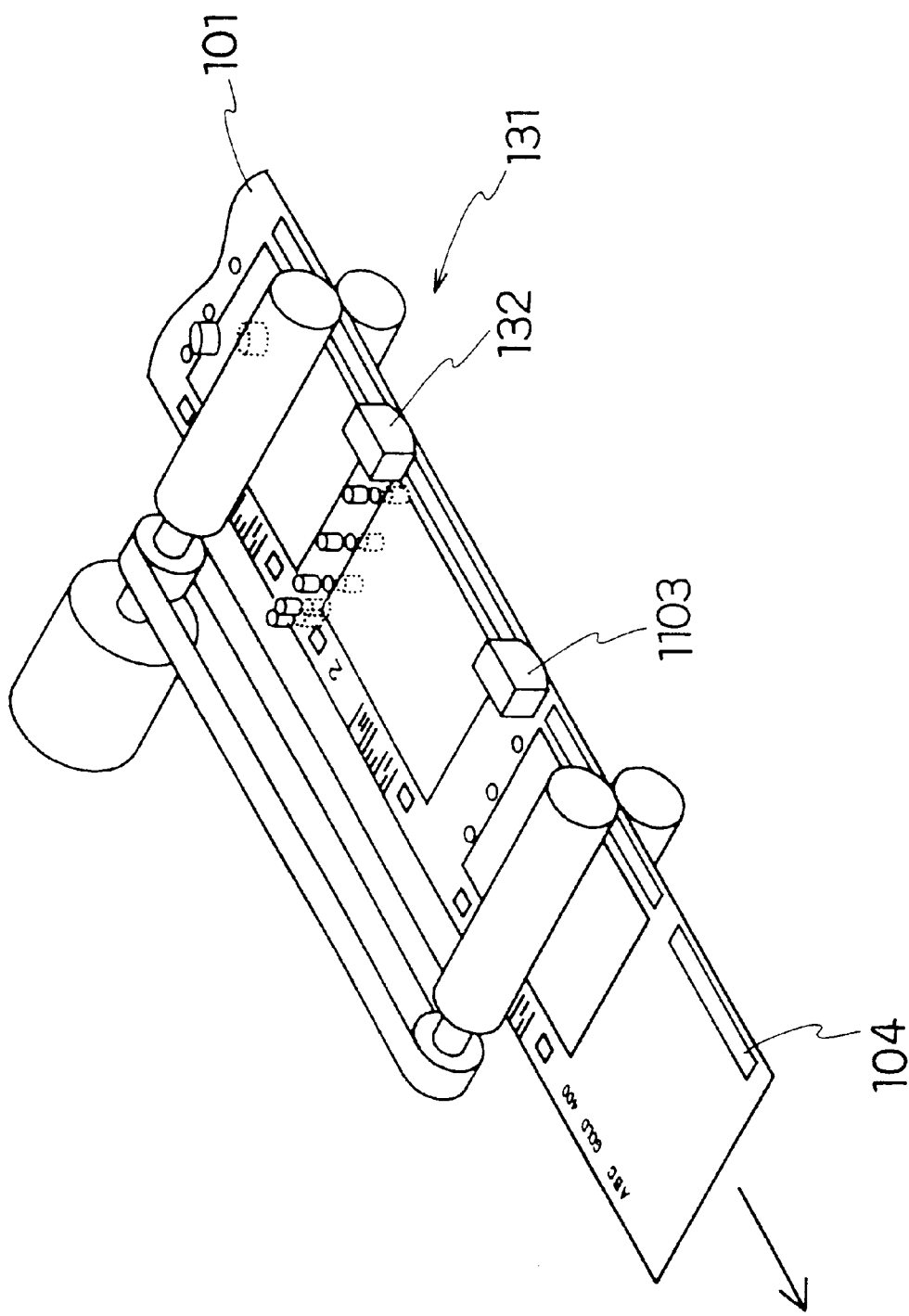
FIG. 22 is a perspective explanatory diagram showing an example of a reading mechanism of film information having a writing mechanism in accordance with the present invention.
Figure 23:
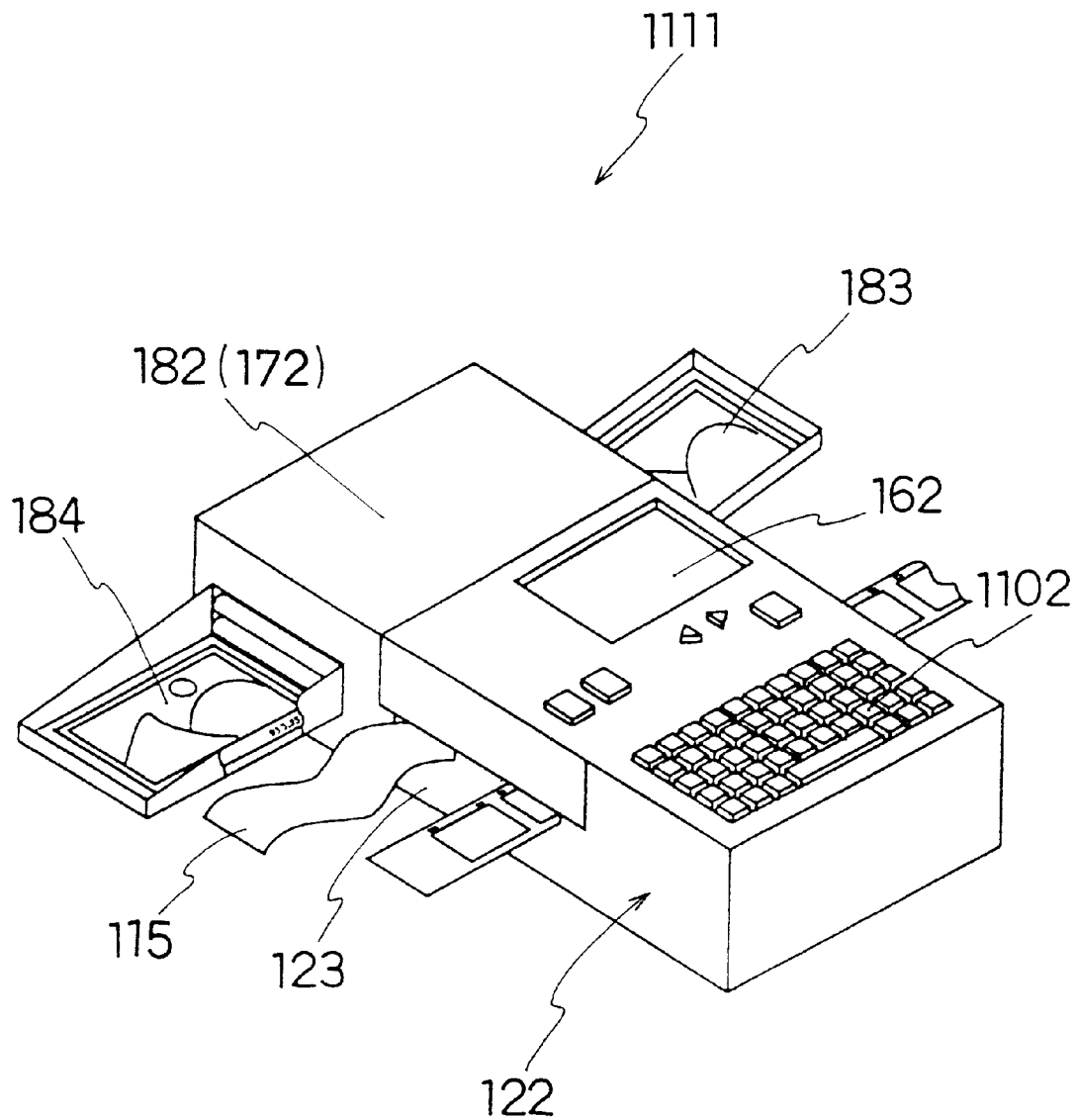
FIG. 23 is an external perspective view showing a still further embodiment of a film information printing apparatus of the present information.

As shown in FIG. 22, the film information printing apparatus 1101 in FIG. 21 includes a magnetic head 1103 for writing, aside from the magnetic head 132 for reading (refer to FIG. 7). The key-input information through the keyboard 1102 is transmitted to a control unit described later to be converted into magnetic information, and then written into the magnetic recording layer 104 of the film 101 by the magnetic head 1103 for writing.

Besides, by reading the magnetic recording information by the reading mechanism 131, the information can be displayed in the monitor 162 and edited by the keyboard 1102. The edited information is written into the magnetic recording layer 104 of the film 101.

Such editing is convenient in the case where the print format information initially entered at photographing with a camera, such as panorama size, is changed in order to print in normal size, or the like, or in the case where the information desired to be printed on the reverse side of the photograph is newly added or corrected.

Figure 24:
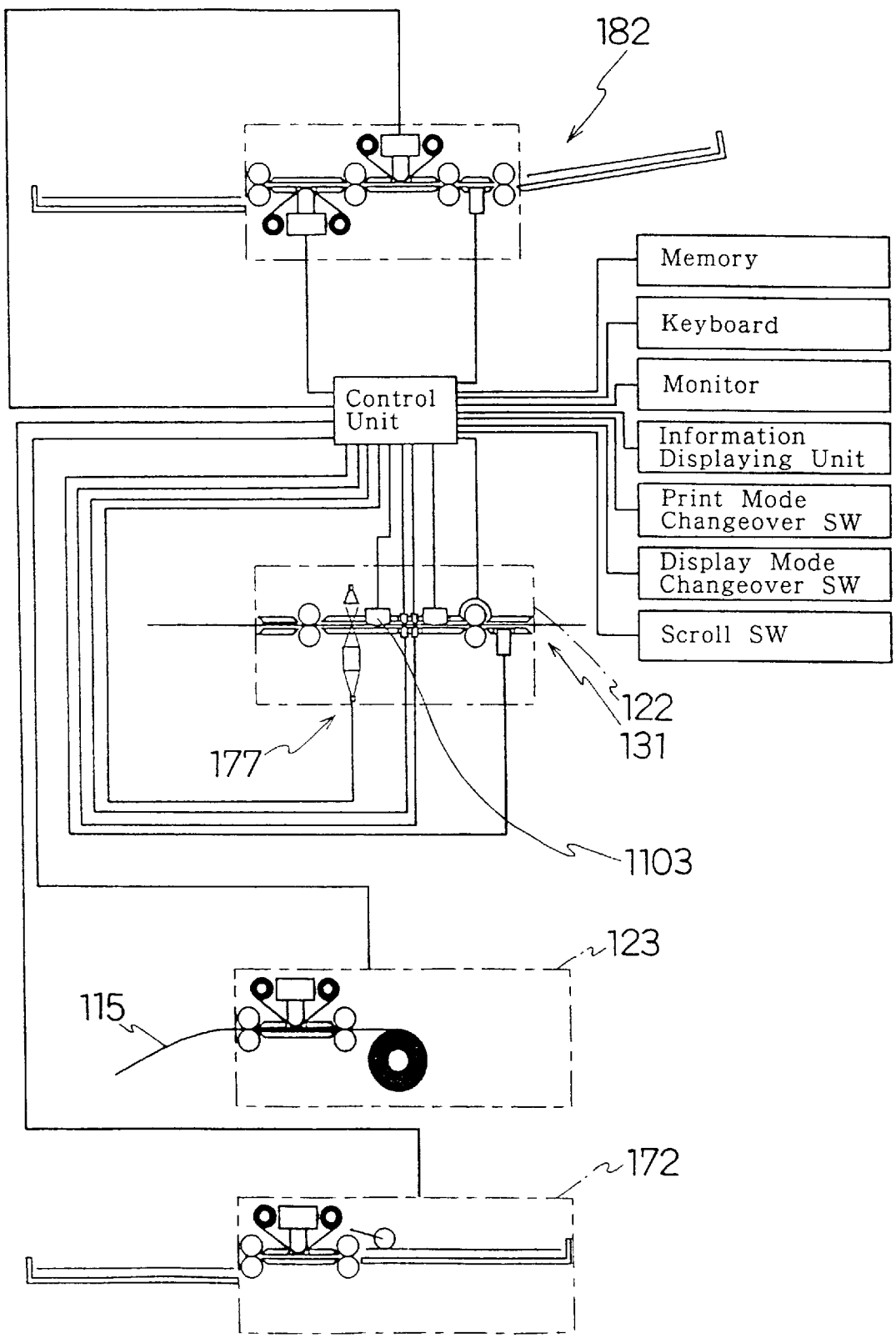
FIG. 24 is a control diagram of the film information printing apparatus in FIG. 23.

A film information printing apparatus 1111 in FIG. 23 comprises a film information reading unit 122, an information print unit 123, a paper printing unit 182, an index printer 172, and a keyboard 1102. Inside of the film information reading unit 122 are provided, as shown in FIG. 24, with a film information reading mechanism 131, a magnetic head 1103 for writing as film information writing mechanism, and a picture reading mechanism 177. The information of these mechanism is transmitted to a control unit, and instructions are directed to the paper printing unit 182, information printing unit 123, and index printer 172 through the control unit.

Meanwhile, the film information printing apparatus of the present invention might be provided with the element for printing the information on the recording paper as mentioned above (information printing unit 123). A film information printing apparatus 1112 in FIG. 25 comprises a monitor 162 as display mechanism, an information reading unit 122, a paper printing unit 182, and/or an index printer 172. In this case, with respect to information necessary for printing, the index print is first prepared, and the panorama size, or the like can be judged based on the index print. It is also possible to know such information by the monitor 162.

FIG. 26 is a perspective explanatory diagram showing an embodiment of an information processing apparatus of the present invention. Inside the information processing apparatus 1113 are provided, as shown in FIG. 22, an information reading mechanism 131, a magnetic head 1103 for writing as film information writing mechanism, and a picture reading mechanism 117. While observing the monitor 162, the information is edited on the keyboard 1102.

In the last place, an index printer of the invention is described below.

Figure 27:
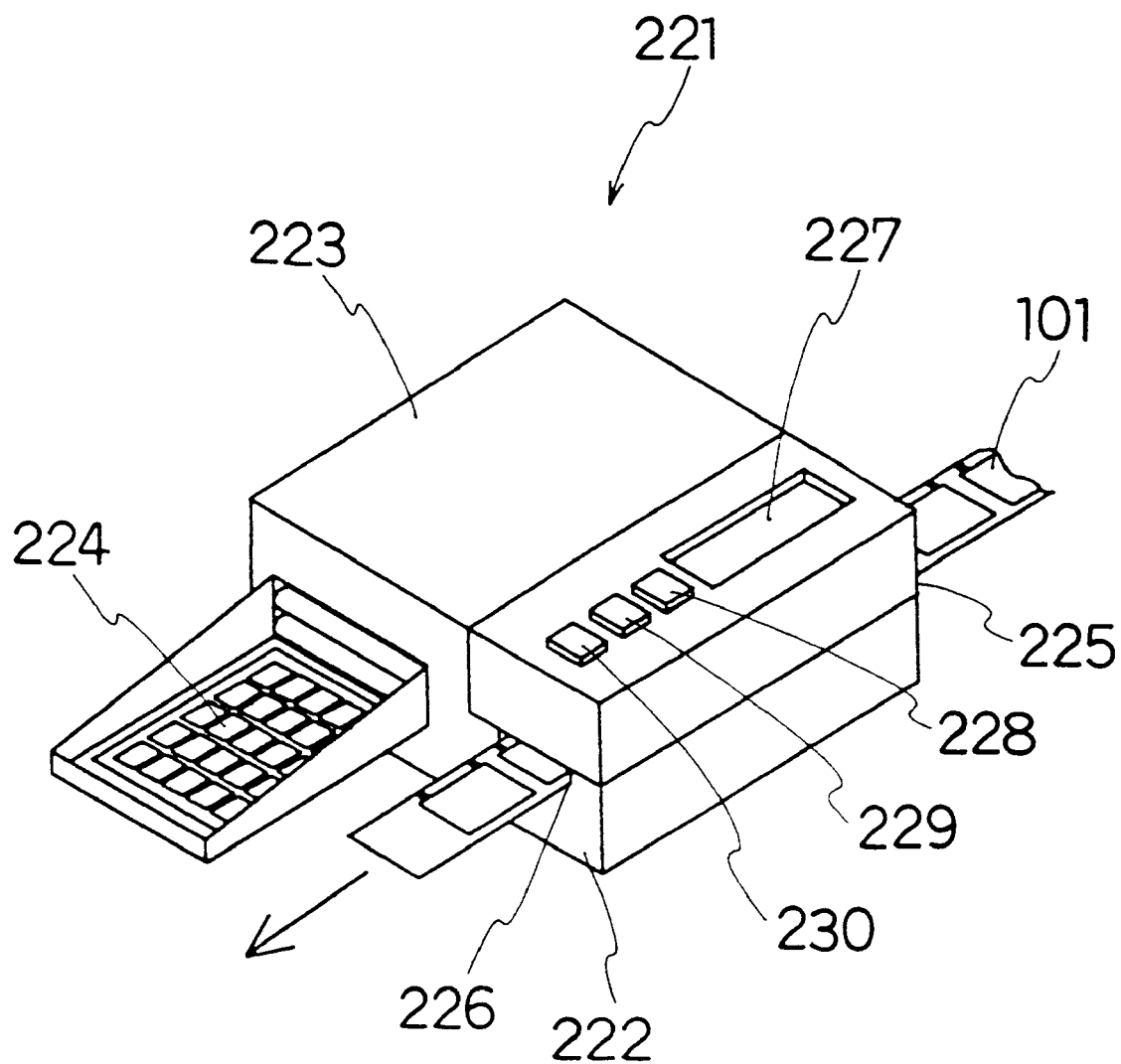
FIG. 27 is an external perspective view showing an embodiment of an index printer of the present invention.

FIG. 27 is a perspective view showing the appearance of an embodiment of the index printer of the present invention. This index printer 221 includes a reading unit 222 and a printer unit 223. The reading unit 222 comprises a picture reading mechanism and an optical information reading mechanism for reading the picture 102 recorded in the photosensitive emulsion layer 103 of the film 101 shown in FIG. 5 and the information 105 to 110 recorded to be readable optically, respectively, and a magnetic information reading mechanism for reading the information recorded in the magnetic recording layer 104. It is preferred to incorporate both optical information reading mechanism and magnetic information reading mechanism so as to read the recorded information in both photosensitive emulsion layer 103 and magnetic recording layer 104, but it might be also preferred to read either one from the viewpoint of cost. The read picture and information are laid out by the control unit described later, and printed out on the surface side and reverse side of the paper by the printer unit 223. Reference numeral 225 is a film inlet, 226 is a film outlet, 227 is a monitor, 228 is a display mode changeover switch, 229 is a print mode changeover switch, and 230 is an index print mode changeover switch.

Figure 28:
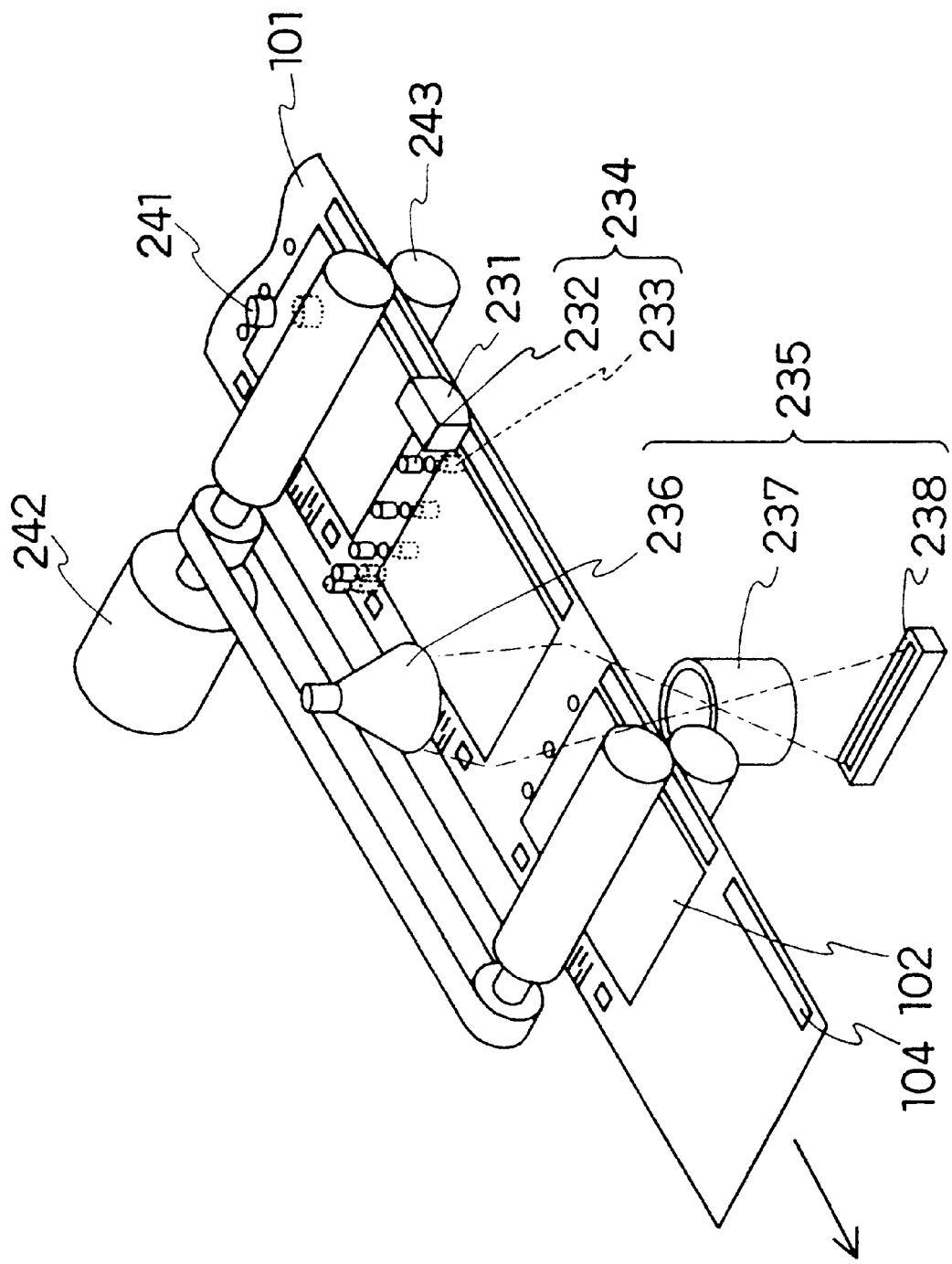
FIG. 28 is a perspective explanatory diagram showing an internal constitution of an index printer of the present invention.

Referring to FIG. 28, the internal structure of the reading unit 222 is described below. Reference numeral 231 is a magnetic head for reading the record of the magnetic recording layer 104 (magnetic information reading mechanism), while a sensor 232 and a light emitting diode 233 for reading the record of the photosensitive emulsion layer 103 compose an optical information recording mechanism 234. The picture reading mechanism 235 is composed of a lamp 236, a lens 237, and a line CCD 238. The picture 102 on the film 101 is read by the line CCD 238.

Reference numerals 241 to 243 are film conveying mechanisms, and when the film 101 is inserted into the film inlet 225 shown in FIG. 27, the film detection sensor 241 detects the film 101 to put the motor 242 into rotation. The film 101 is conveyed by the film feed roller 243, and then sent out into the film outlet 226 shown in FIG. 27.

The recorded information in the magnetic recording layer 104 is converted into electric signals by being passed through the magnetic head 231, and transmitted to a control unit mentioned later. The optically readable information detected by the sensor 232 is also converted into electric signals to be transmitted to the control unit.

The internal structure of the printer unit 223 is described below with reference to FIG. 29. As the index printer of the present invention, it is preferred to print the surface side including the picture by thermal dye sublimation transfer method, and print the character information to be printed on the reverse side by dot impact method. The present invention is not, however, limited thereto, and the surface side including the picture might be printed by ink jet method or dry process silver halide photography.

Figure 29:
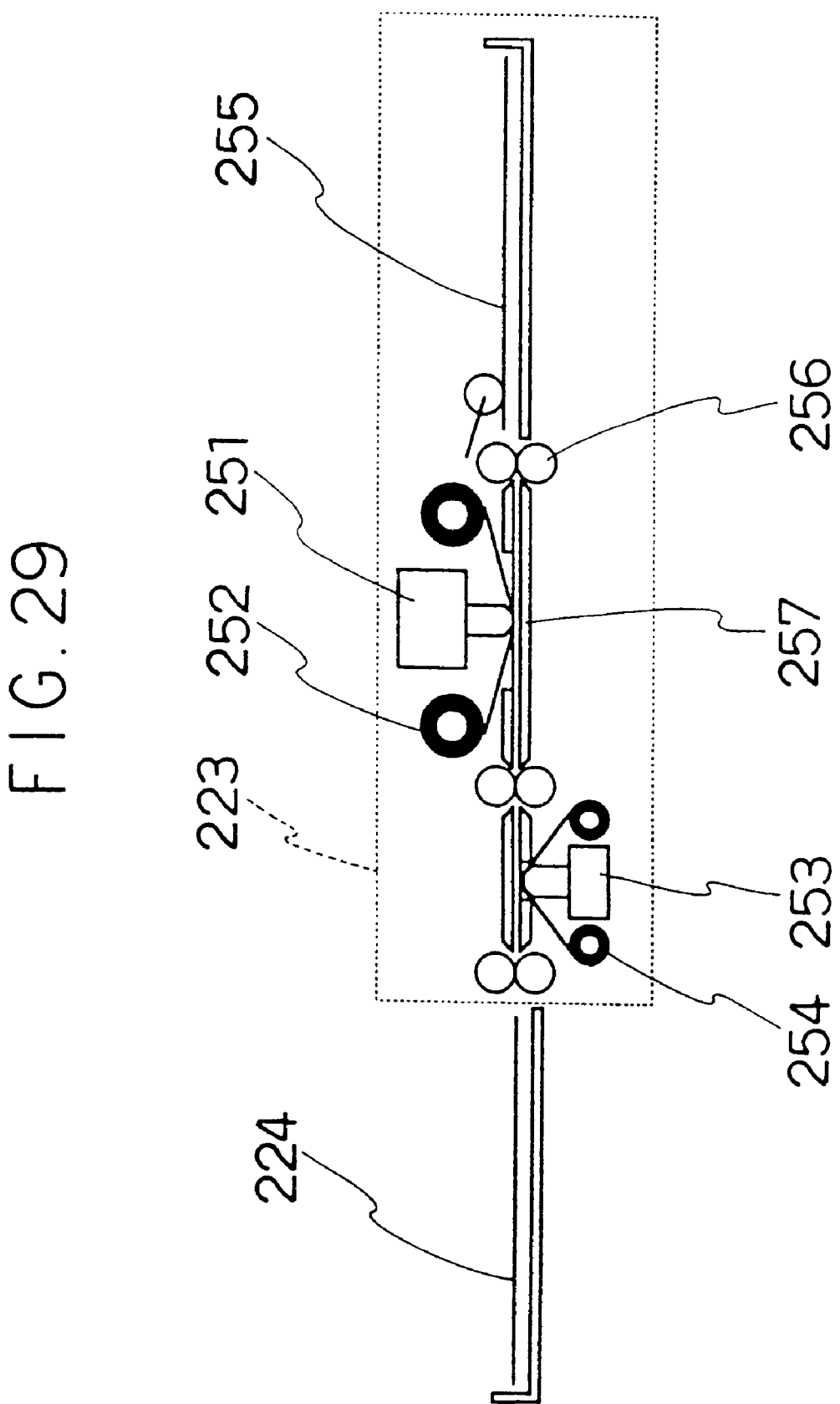
FIG. 29 is an explanatory side view showing a printing mechanism in the present invention.

The printer 223 in FIG. 29 prints the surface side including the picture by the thermal dye sublimation transfer print head 251 and thermal dye sublimation transfer ink ribbon 252, and prints the reverse side by the printing head 253 and printing ink ribbon 254. Reference numeral 255 denotes the paper before printing, 256 is a paper feed roller, and 257 is a paper guide. In particular, by installing the printing head 253 and printing ink ribbon 254, massive information can be printed on the reverse side, aside from the picture.

A practical example of the index capable of printing by the index printer of the present invention described below with reference to FIGS. 30 to 33.

Figure 30:
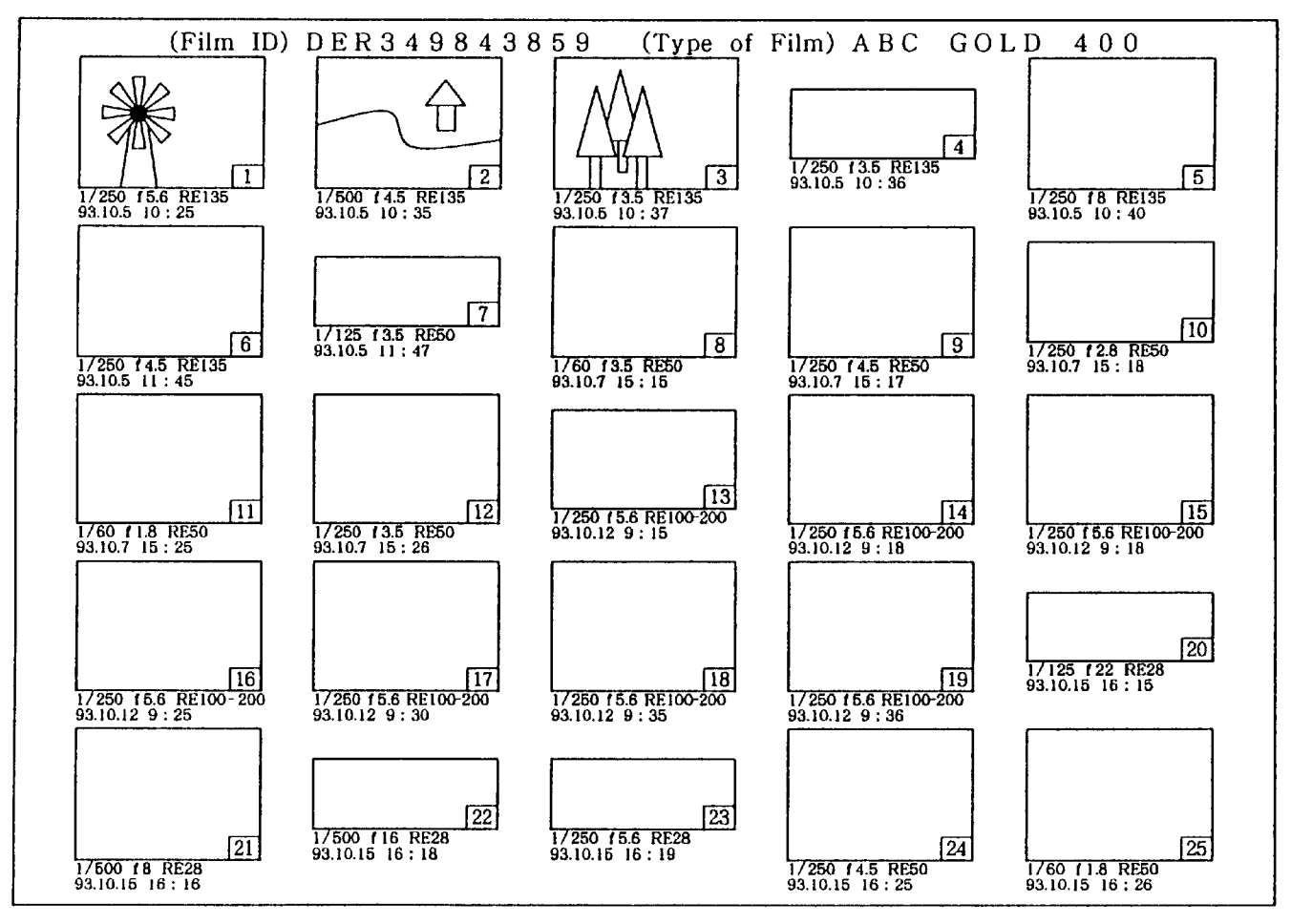
Figure 31:
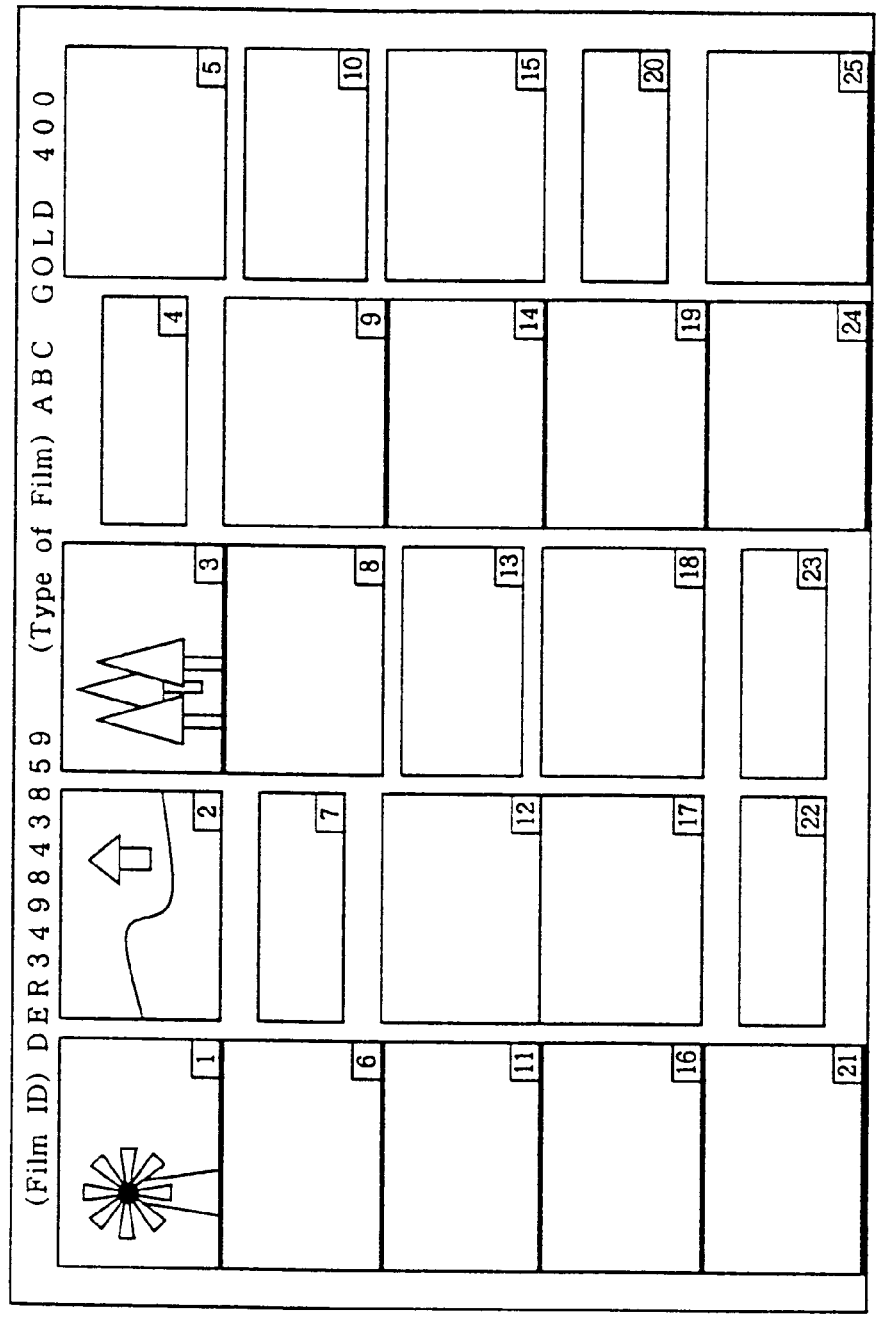
FIG. 31 is another print example on the surface side of the index print.

In FIG. 30 and FIG. 31, the picture is properly disposed and printed at the surface side of the index print. In FIG. 30, the shutter speed, iris value, and date and time of photographing are printed beneath the picture, and FIG. 31 is laid out so that the picture appears in full size, being accompanied only by the frame number. Whether the surface side is as shown in FIG. 30 or in FIG. 31 is changed over by the index print mode changeover switch 230.

FIG. 32 and FIG. 33 show the reverse side of the index print, in which character information is printed. In FIG. 32, the character information is printed in the frame partitioned in the same layout as in the surface side of the index print shown in FIG. 30 and FIG. 31, and FIG. 33 shows printing of character information in the sequence of frame numbers. Whether the reverse side is as shown in FIG. 32 or in FIG. 33 is changed over the print mode changeover switch 229.

The index printer 221 of the present invention might include a monitor 227, and a display mode changeover switch 228 for changing over the display of the minotor 227, thereby the picture and character information read by the reading unit 222 and laid out by the control unit can be displayed on the monitor 227 and confirmed.

Figure 34:
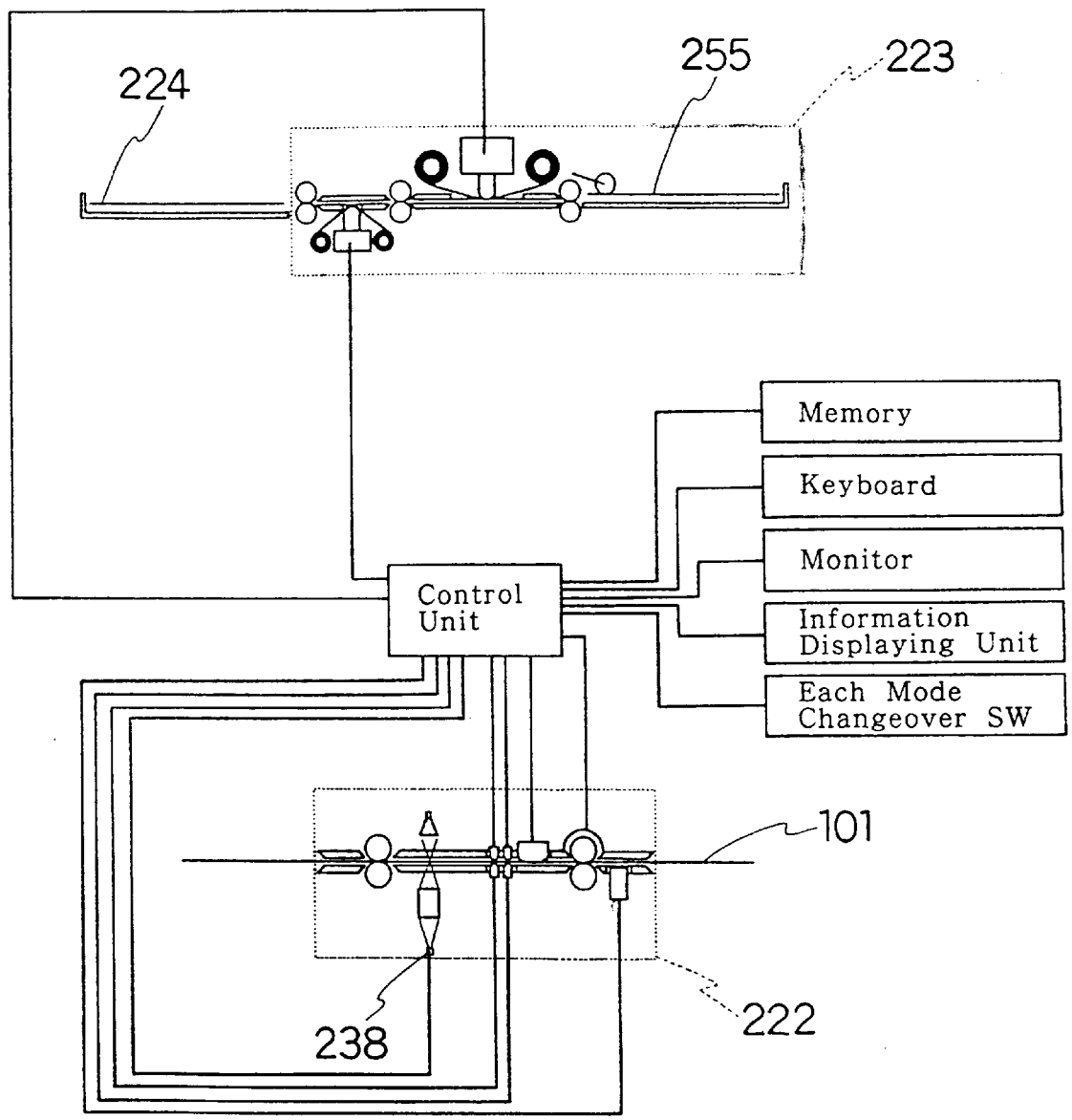
FIG. 34 is a control diagram of an index printer of the present invention.

FIG. 34 is a control diagram of the index printer of the present invention.

From the film 101, pictures of plural frames of the film 101 are read by the line CCD 238, and the pictures of plural frames are printed in one or plural sheets on the basis of the read picture date and read recorded information, and thus the index print 224 is prepared. The index print 224 is properly laid out in the control unit depending on the number of read pictures 102 and the size and the size of paper 255 to be printed.

The memory stores examples of print layout depending on the number of pictures 102 and size of the paper 255, and it is preferred that the layout and character information displayed on the monitor can be properly changed through the keyboard. By the keyboard, or the like, moreover, the printing character size can be properly instructed depending on the quantity of information to be printed on the reverse side.

Besides, only the picture might be printed on the surface side while printing various kinds of film information only on the reverse side of the index print. In this case, a wider space is preserved for the picture. In the present specification, the expression "at least on the reverse side" means both the case of printing on the reverse side only and the case of partly printing also on the surface side.

As described so far, according to the communication apparatus of the present invention, even in the existing printing apparatus incapable of reading the magnetic information on the film, photographic printing can be executed by communication of the printing information output from the communication apparatus, only by modifying the control board of the memory control device in the printing apparatus.

Besides, since the information output from the communication apparatus can be also printed, photographic printing can be executed in the existing printing apparatus without modifying.

Since photographic printing is executed on the basis of the printing information recorded in the magnetic film, it requires no labor in adjustment of printing, and the photographic printing efficiency is superior.

By connecting with various printers and displays, for example, the screen can be confirmed by observing the index printer, and only necessary pictures can be enlarged or printed, so that the commercial service can be enhanced.

The film information printing apparatus of the present invention is to read out the information recorded in the photosensitive emulsion layer and/or magnetic recording layer of the film. Such function is not provided in the conventional printing machine, and therefore with the apparatus of the invention, it is possible to cope with the film of new type capable of recording such information, readily with a minimum cost.

In the index printer of the present invention, since massive information recorded in the magnetic recording layer and others of the film can be printed on the reverse side of the index print, the frame picture on the surface side can be shown in a wide area. Moreover, since the space of the reverse side can be widely utilized, it is possible to print in large characters, so that it is easy to read the characters.

What we claim is:

1. A film information communication apparatus for use with a photograph-printing apparatus comprising:

a picture reading mechanism for reading information recorded in a photosensitive emulsion layer associated with each frame in a developed photographic film having a photosensitive emulsion layer and a magnetic recording layer;

a magnetic recording and reading mechanism for reading information recorded in the magnetic recording layer of said developed photographic film;

a film information reading mechanism for reading information, associated with each respective film frame, recorded in a portion of the film other than the photosensitive emulsion layer and the magnetic recording layer, respectively;

a communication control device for receiving the information read by each said reading mechanism with respect to each respective film frame and outputting said information;

a printer in said photograph-printing apparatus operative to print information produced by the communication control device;

said mechanisms and said communication control device being disposed separately from said photograph-printing apparatus and from each other and being operative to convey photograph-printing information to said printer; and a communication cable operative to convey said photograph printing information between said communication control device, said mechanisms and said printer.

2. The film information communication apparatus of claim 1, wherein the magnetic recording and reading mechanism writes printing correction information in the developed photographic film.

3. The film information communication apparatus of claim 1, including a display operative to show index print information from the printing information.

4. The film information communication apparatus of any one of claims 1 and 2, wherein the printer outputs index print information from the printing information.

5. The film information communication apparatus of any one of claims 1 and 2, including a display for showing index print information out of the printing information.

6. The film information communication apparatus of any one of claims 1 and 2, wherein the printer prints out back print information from the printing information.

7. The film information communication apparatus of claim 6, wherein the back print information is printed on an adhesive sheet.

8. A film information printing apparatus for use with a photograph-printing apparatus comprising:

at least one of a mechanism for reading optically readable information preliminarily recorded in a photosensitive emulsion layer in a developed photographic film including a photosensitive emulsion layer and a magnetic recording layer and a mechanism for reading information preliminarily recorded in the magnetic recording medium;

a recording paper printing mechanism for printing the recording information read by the reading mechanism of the film information on a recording paper, said mechanisms being disposed separately from said photograph-printing apparatus and being operative to convey photograph-printing information received to a separate communication control device; and a communication cable operative to convey printing information from said communication control device to said photographic-printing apparatus.

9. The film information printing apparatus of claim 8, wherein the apparatus further includes a display mechanism for displaying the information read by the reading mechanism of film information.

10. The film information printing apparatus of any one of claims 8 and 9, wherein the apparatus further includes a paper printing mechanism for printing information read by the reading mechanism of film information on the reverse side and/or surface of the printed and developed paper.

11. The film information printing apparatus of claim 10, wherein the magnetic recording layer of said developed photographic film is writable, and the apparatus includes a writing mechanism and a keyboard for writing magnetic recording information on said developed photographic film.

12. The film information printing apparatus of any one of claims 8 and 9, wherein the apparatus further includes a picture reading mechanism for reading pictures taken in the photosensitive emulsion layer of said developed photographic film, and an index print mechanism for printing picture data read by the picture reading mechanism in one or plural sheets.

13. The film information printing apparatus of claim 12, wherein the apparatus further includes a paper printing mechanism for printing information read by the reading mechanism of the film information on the reverse side and/or surface of the printed developed paper.

14. The film information printing apparatus of claim 12, wherein the magnetic recording layer of said developed photographic film is writable, and the apparatus includes a writing mechanism and a keyboard for writing magnetic recording information on said developed photographic film.

* * * * *